United States Patent
Hakki et al.

(10) Patent No.: US 10,814,811 B2
(45) Date of Patent: Oct. 27, 2020

(54) COLLISION DETECTION SYSTEM

(71) Applicants: A-Hamid Hakki, Dunedin, FL (US);
Maryam Hakki, Dunedin, FL (US);
Dina A. Hakki, Dunedin, FL (US);
Belmina Hakki, Dunedin, FL (US)

(72) Inventors: A-Hamid Hakki, Dunedin, FL (US);
Maryam Hakki, Dunedin, FL (US);
Dina A. Hakki, Dunedin, FL (US);
Belmina Hakki, Dunedin, FL (US)

(73) Assignee: PHYSICIAN ELECTRONIC NETWORKS, L.L.C., Dunedin, FL (US)

(*) Notice: Subject to any disclaimer, the term of this patent is extended or adjusted under 35 U.S.C. 154(b) by 0 days.

(21) Appl. No.: 16/506,408

(22) Filed: Jul. 9, 2019

(65) Prior Publication Data
US 2019/0344740 A1    Nov. 14, 2019

Related U.S. Application Data

(63) Continuation-in-part of application No. 15/721,752, filed on Sep. 30, 2017, now Pat. No. 10,392,013.

(51) Int. Cl.
*B60R 21/0132*    (2006.01)

(52) U.S. Cl.
CPC ... *B60R 21/0132* (2013.01); *B60R 2021/01322* (2013.01)

(58) Field of Classification Search
CPC .................................................. B60R 21/0132
USPC .............. 340/425.5, 901–905, 933, 937, 435
See application file for complete search history.

(56) References Cited

U.S. PATENT DOCUMENTS

| | | | | |
|---|---|---|---|---|
| 3,668,651 A * | 6/1972 | Hornung | ............. | G06F 13/26 710/3 |
| 5,510,793 A * | 4/1996 | Gregg, III | ............. | G01S 13/60 342/104 |
| 5,719,771 A * | 2/1998 | Buck | ............. | G07C 5/008 340/438 |
| 5,948,035 A | 9/1999 | Tomita | | |
| 6,223,125 B1 * | 4/2001 | Hall | ............. | G08G 1/164 701/301 |
| 6,701,234 B1 * | 3/2004 | Vogelsang | ............. | G01P 1/122 340/439 |
| 6,733,134 B2 | 5/2004 | Bleiner | | |

(Continued)

*Primary Examiner* — Daryl C Pope
(74) *Attorney, Agent, or Firm* — Larson & Larson, P.A.; Frank Liebenow; Justin P. Miller

(57) ABSTRACT

A collision detection system has one or more sensors for determining an instantaneous velocity of a vehicle. A computer is interfaced to the one or more sensors. The computer obtains the instantaneous velocity of the vehicle from the one or more sensors. The computer is operatively configured to execute software that operates the computer to iteratively calculate an acceleration of the vehicle as a rate of change of the instantaneous velocity over a period of time. The software declares a collision when the acceleration is greater than a predetermined value (e.g. 1.1 g) or the acceleration is less than a predetermined negative value (e.g. −1.1 g). In another embodiment, the microprocessor declares a collision when the acceleration/deceleration or the turning angle or the turning radius values exceed factory setting for the vehicle. The software determines the severity of collision based on the magnitude of deviation from the predetermined values.

22 Claims, 16 Drawing Sheets

(56) References Cited

U.S. PATENT DOCUMENTS

| | | |
|---|---|---|
| 7,049,978 B2 | 5/2006 | Li |
| 7,375,621 B1 | 5/2008 | Hines |
| 9,221,392 B2 | 12/2015 | Chen |
| 9,221,509 B2 | 12/2015 | Lai |
| 9,799,223 B2 | 10/2017 | Nespolo |
| 10,089,847 B2 * | 10/2018 | Zhu ................... H04N 7/147 |
| 2002/0035422 A1* | 3/2002 | Sasaki ................ G07C 5/085 |
| | | 701/32.2 |
| 2004/0222904 A1* | 11/2004 | Ciolli ................... G08G 1/04 |
| | | 340/937 |
| 2005/0128103 A1* | 6/2005 | Bachelder .......... G08G 1/087 |
| | | 340/906 |
| 2005/0259033 A1 | 11/2005 | Levine |
| 2007/0159311 A1 | 7/2007 | Schober |
| 2008/0219014 A1 | 9/2008 | Loibi |
| 2009/0140887 A1* | 6/2009 | Breed ................. G01S 17/86 |
| | | 340/990 |
| 2009/0210117 A1* | 8/2009 | Oowada ........... B60R 21/0132 |
| | | 701/46 |
| 2010/0030540 A1* | 2/2010 | Choi ................. G01S 5/0027 |
| | | 703/8 |
| 2010/0073194 A1* | 3/2010 | Ghazarian ........... G08G 1/164 |
| | | 340/901 |
| 2010/0253493 A1 | 10/2010 | Szczerba |
| 2010/0283590 A1 | 11/2010 | Tee et al. |
| 2010/0290774 A1 | 11/2010 | Matsuoka |
| 2011/0307175 A1* | 12/2011 | Gandhi ................ G08G 1/166 |
| | | 701/301 |
| 2012/0065876 A1* | 3/2012 | Kadowaki ........... G08G 1/161 |
| | | 701/300 |
| 2012/0095646 A1* | 4/2012 | Ghazarian ............ G01S 19/17 |
| | | 701/36 |
| 2012/0112635 A1 | 5/2012 | Cho |
| 2012/0206602 A1* | 8/2012 | Clucas ................. G06T 7/246 |
| | | 348/149 |
| 2013/0063282 A1* | 3/2013 | Baldwin .............. B61L 29/282 |
| | | 340/941 |
| 2013/0293395 A1* | 11/2013 | Ohama .................. G08G 1/16 |
| | | 340/904 |
| 2014/0095061 A1 | 4/2014 | Hyde |
| 2014/0267415 A1 | 9/2014 | Tang |
| 2014/0336848 A1* | 11/2014 | Saund ................. G08G 1/054 |
| | | 701/3 |
| 2015/0166072 A1 | 6/2015 | Powers |
| 2015/0203023 A1 | 7/2015 | Marti |
| 2016/0096486 A1 | 4/2016 | Dziurda |
| 2016/0327645 A1* | 11/2016 | Nishimoto ............. G01S 7/003 |
| 2017/0101147 A1 | 4/2017 | Hasegawa |
| 2017/0113604 A1 | 4/2017 | Asaoka |
| 2018/0072220 A1 | 3/2018 | Yan |
| 2018/0308344 A1* | 10/2018 | Ravindranath ....... G08B 27/001 |
| 2019/0329708 A1* | 10/2019 | Hakki ..................... B60O 1/50 |
| 2019/0335035 A1* | 10/2019 | Borras .............. H04M 1/72569 |

* cited by examiner

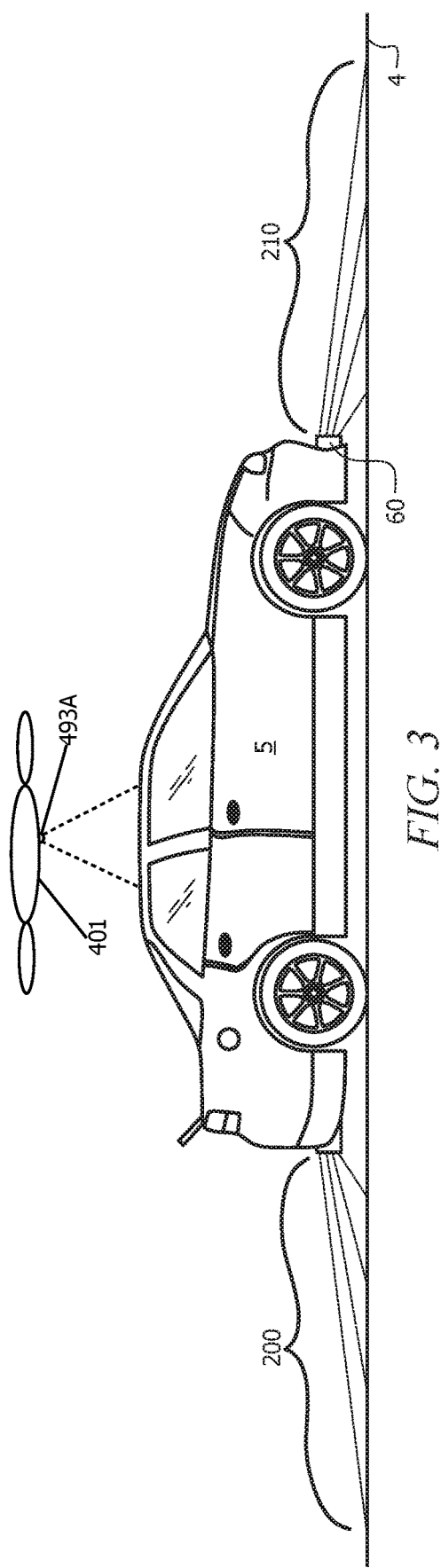
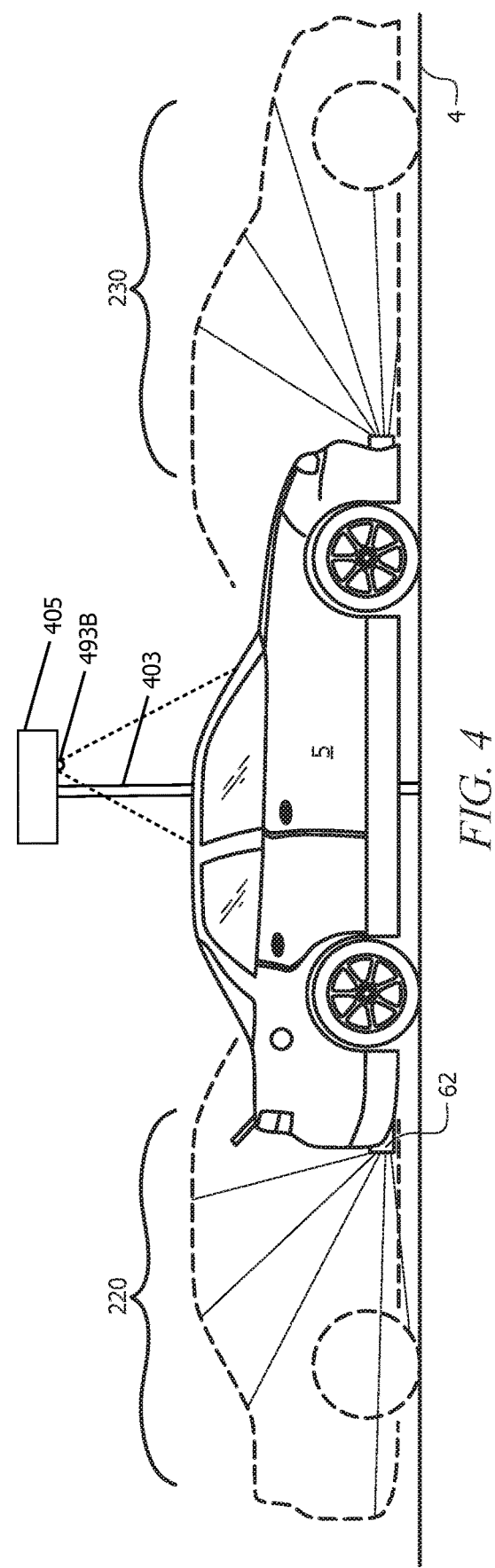

COLLISION DETECTION SYSTEM

CROSS-REFERENCE TO RELATED APPLICATION

This application is a continuation in part of U.S. patent application Ser. No. 15/721,752, filed Sep. 30, 2017, now U.S. patent Ser. No. 10/392,013 issued Aug. 27, 2019, the disclosure of which is hereby incorporated by reference.

FIELD

This invention relates to the field of motor vehicles and more particularly to a system for detecting collisions.

BACKGROUND

Today, vehicles such as cars, boats, and aircrafts move at speeds that expose their occupants to the risk of body injury and death in the event of a collision. Car accidents are a major cause of morbidity and mortality. Annually, about 3 million people are injured, many are permanently disabled and many die as a result of their injuries. Seatbelts and inflatable safety devices (air bags) have undoubtedly saved innumerable lives. However, one issue with airbags and seatbelts is that they are deployed after a collision and not before.

Measures to prevent collisions are far more valuable in saving lives than measures deployed after a crash. Sensors have been utilized to prevent accidents such as using ultrasound, video cameras, lasers and radar. However, signals/alarms emanating from monitoring these sensors are available only to the driver of the vehicle into which they are integrated, and not to drivers of other vehicles. In addition, once a collision has occurred, there is currently no reliable method to immediately discover, quantify and report the accident.

Fender benders are the most common type of motor vehicle accidents. Two million or more occur each year, in parking lots, when backing up into oncoming traffic, or when stopping suddenly. Although rarely a cause of serious injuries, fender benders often result in costly repairs and increased in insurance rates. In order to prevent Fender Benders, a variety of technologic advances have been deployed. Recently, forward-collision detection and lane-departure electronic signals warn the driver of the vehicle to take corrective action, usually by a visual and/or audible warning whenever a car strays from its lane or gets too close to the car ahead. Color coding of the closeness to the car ahead helps to alert the driver as to the distance ahead, green, yellow and red. These warnings are often muted at low speeds, such as less than 15 miles per hour. Forward-collision detection and lane-departure detection systems typically rely on radar, ultrasound, or camera imaging.

Tailgating is responsible for more than one third of all motor vehicle accidents. Tailgating is defined as a vehicle encroaching on the safe space between that vehicle and a leading vehicle (the car ahead of you). When tailgating occurs, it is often impossible to stop your vehicle in the event that the leading vehicle decelerates suddenly, resulting in a collision. This "safe" distance varies with several factors such as vehicle specification and make, speed of vehicle, road conditions, darkness (ambient light), and weather conditions. Current sensors are available to estimate this "safe" distance, but the information is only available to the driver of the vehicle on which those sensors are integrated. Safety tips such as maintaining a distance between your vehicle and the leading vehicle (e.g. car ahead of you) often suggest keeping 10 feet of distance for every 10 mile per hour of speed. For instance, 60 feet is deemed a safe distance for speeds of 60 mph. This distance increases during inclement weather. There is also a two second rule between the vehicle and the leading vehicle as each passes a stationary object (e.g. a light post or a road sign). This relies on the driver accurately measuring two seconds between when the leading vehicle passes the stationary object and when the driver's vehicle passes the stationary object. The two second rule applies to dry road conditions, as four seconds is recommended for wet roads, and ten seconds for snow or ice-covered roads. Tailgating is not only illegal but also causes serious and fatal accidents. In addition, tailgating is rarely documented.

Drivers of vehicles backing up in a parking lot may have difficulty seeing pedestrians or other vehicles in the line of travel. Similarly, drivers parking (looking for a parking space) and pedestrians may have difficulty seeing cars that are backing out of parking spaces.

Many vehicular accidents are avoidable. Often, a driver of a first vehicle (index vehicle) is following too close behind a second vehicle and, when the second vehicle slows down or stops, the driver of the first vehicle (index vehicle) has insufficient time to stop, thereby resulting in a collision.

Drivers are human, and each driver constantly makes driving decisions based upon speed, road conditions, traffic, etc. It is often recommended that one maintain at least one car length per ten miles per hour, but it is often difficult to determine five or six car lengths, as this is an imaginary distance and based on a fictional car size as imagined by the driver. Other than vehicle velocity, stopping distance is impacted by the road surface, road conditions (e.g. wet, snow, ice), tire conditions, vehicle load, tire condition, tire pressure, brake shoe wear, etc. These factors also apply to self-driving vehicles.

To this, it is difficult for a driver to know what a safe following distance might be given such diverse condition. Yet, driving at a safe distance from other vehicles is critical to avoiding accidents.

There have been some limited attempts to provide a system that projects an image onto the roadway for helping with distance control between vehicles. For example, U.S. Pat. No. 9,221,509 to Lai for a Display Apparatus and Vehicle Having Projector Device has a display projection system for a vehicle that presents data on a roadway surface in front of the vehicle. The shape, size, and/or location of the projected image are not dynamic and do not change based upon factors that are critical to preventing a collision such as vehicle speed, road conditions, steering wheel rotation, etc., and therefore cannot be relied upon to reliably prevent collisions U.S. Pat. Publication 2008/0219014 to Loibi for a Bicycle Bumper with a Light Generating a Bike Lane has a light emitter on a bicycle that emits a pattern indicating to other bikers an unsafe passing area. Again, this is a static pattern that does not change based upon bicycle speed, road conditions, steering direction, etc.

Sometimes, when a collision does occur, one or more occupants of the vehicle(s) involved require medical attention, but medical help is often miles away. As trauma is often involved, the length of time between when the collision occurred and when emergency personnel arrive is critical and even seconds will determine whether some people will live or die. Therefore, in such situations, immediate alerting of emergency responders (e.g. police, fire, ambulance, EMT) is of utmost importance.

What is needed is a system that will detect collisions, estimate severity and optionally initiate deployment of emergency responders.

SUMMARY

The system for collision detection monitors velocities of one or more vehicles and determines if a collision occurred based upon a measured acceleration or deceleration rate. It is known that a typical vehicle has a limited acceleration rate, limited by horsepower, mass of the vehicle, tire friction, etc. Likewise, it is known that a typical vehicle has a limited deceleration rate, limited by brake performance, mass of the vehicle, tire friction, etc. In some embodiments, the maximum possible deceleration and acceleration for any vehicle is preprogrammed (e.g. as a factory settings) as a predetermined value. Any deceleration beyond that point is, by definition, a collision. In addition, using the disclosed imaging systems, collisions are also detected by unexpected trajectories of vehicles such as a vehicle suddenly moving to the left or right (an acceleration value to the left or right).

Vehicles have factory set turning angles and radii. For an average car, any front wheel turning angle more than 70 degrees or a turning radius of less than 20 feet determined by sensors is considered a collision. For all vehicles, such as cars, buses, boats, any turning angle or radius greater that factory setting constitutes a collision.

In one embodiment, a collision detection system is disclosed having one or more sensors for determining an instantaneous velocity of a vehicle. Velocity is defined as speed (distance divided by time) with direction. A computer is interfaced to the one or more sensors; the computer obtains the instantaneous velocity of the vehicle from the one or more sensors. The computer is operatively configured to execute software that operates the computer to iteratively calculate an acceleration of the vehicle as a rate of change of the instantaneous velocity over a period of time. The software declares a collision when the acceleration is greater than a predetermined value (e.g. 1.1 g) or the acceleration is less than a predetermined negative value (e.g. −1.1 g). Any acceleration or deceleration beyond the predetermined value or the value set by the manufacturer is a collision, and the predetermined value, in some embodiments, is further altered by factors such as road and tire condition.

In another embodiment, a method of avoiding a collision is disclosed including measuring a first velocity of a vehicle at a first point in time and measuring a second velocity of the vehicle at a second point in time, then calculating a velocity difference between the first velocity and the second velocity and calculating an acceleration by dividing the velocity difference by a difference between the first point in time and the second point in time. A collision is declared if the acceleration is greater than a predetermined value or the acceleration is less than a predetermined negative value.

In another embodiment, program instructions are tangibly embodied in a non-transitory storage medium for detecting a collision, The at least one instruction includes computer readable instructions iteratively read one or more sensors that provide an instantaneous velocity of a vehicle and then iteratively calculate an acceleration of the vehicle as a rate of change of the instantaneous velocity over a period of time. The computer readable instructions declare a collision when the acceleration is greater than a predetermined value or the acceleration is less than a predetermined negative value.

In some embodiments, a vehicle image is projected posteriorly when a vehicle backs out of a parking space, warning pedestrians and drivers of other vehicles that the vehicle is about to enter their path of travel. Similarly, mechanisms are provided to assist the driver of the vehicle that backs out of a parking space so that the driver can better see pedestrians and the other vehicles approaching.

In some embodiments, a video record of the encroaching vehicle is maintained. This video record serves as a deterrent if a complaint is issued to law enforcement as supported by such video record.

When driving at high way speeds, there is no reliable way for a human driver to determine safe distances between vehicles. Counting two seconds and using a reference point is an approximation and even less reliable when road conditions such as rain or snow is a factor. The disclosed system continuously and accurately measures a safe inter-vehicle distance, both in front and behind the vehicle. This dynamic "safety zone" is then shared with other vehicles by projecting a flat image or hologram showing the instantaneous "safety zone." This projection is visible to the driver of the vehicle as well as drivers of nearby vehicles that are potential sources of a collision. The flat image or holographic image is emitted automatically. The size of the "safety zone" is calculated using a computer that calculates safe distances to other vehicles based upon factors such as speed, inertia, tire condition, driver experience, road conditions (wet, dry, snow-covered, ice-covered, etc.), and weather. The flat image or holographic image will be an aid to all vehicles indicative of safe paths and speeds. In some embodiments, video cameras document violations such as tailgating by another driver.

In some embodiments, the flat image or holographic image is bent or curved to reflect turning directions such as U-turns or left turns.

In some embodiments, parking assistance is provided projecting vehicle dimensions relative to the available parking space, to help guide the driver to fit within the parking space.

The flat image's and/or holographic image's dimensions are dynamic and expand or shrink as dictated by weather conditions such as rain, snow or fog, as well as road conditions (e.g. wet, dry, snow-covered, ice-covered), status of the tires, and driver experience.

In some embodiments, the flat image's and/or holographic image's dimensions expand or shrink as dictated by the speed of a trailing vehicle with respect to the speed of the index vehicle that is projecting the flat image and/or holographic image.

In some embodiments, the anterior (front) flat image and/or holographic image is displayed with a dimension proportional to the speed of the index vehicle as the index vehicle approaches the vehicle that is ahead in order to allow for safe deceleration and is visible to vehicles in nearby lanes. The image is activated when the speed of the index vehicle exceeds the speed of the vehicle ahead and the distance between the two vehicles approaches a critical distance below which safe deceleration of the vehicle is problematic. For example, the image is displayed anteriorly (forward) once the vehicle is at a speed and distance as to not be able to decelerate safely in the event that the vehicle ahead suddenly decelerates or stops. In some embodiments, if the vehicle's speed is less than the speed of the vehicle ahead, and the distance between the two vehicles exceeds a distance needed for safe deceleration, then the flat image and/or holographic image is not be displayed.

In some embodiments, the generation of the flat images and/or holographic images is blanked for certain vehicle speeds in the forward direction. For example, the flat images and/or holographic images is emitted only at speeds in a forward direction that exceed 15 miles per hour.

In some embodiments, the dimensions of the flat and/or holographic image of the index vehicle posteriorly is activated based on the speed of a trailing vehicle traveling at speeds greater than the speed of the index vehicle, but the image is not displayed until the trailing vehicle approaches a distance below which safe deceleration in not feasible.

In some embodiments, generation of the flat images and/or holographic images is triggered by shifting into reverse such as when exiting from a parked position, regardless of speed.

Some embodiments provide a panoramic video display from a rear camera mounted to a flexible rod that telescopes in a rearward direction when the vehicle is shifted into reverse as when exiting from a parked position.

In some embodiments, the system includes an audio/video image recording system having rapid sequence film cameras located inside and outside of the vehicle. The audio/video images associated with imminent collision are stored in a memory unit.

In some embodiments, the rear camera telescopes outwardly when backing up and is equipped with sensors in order to determine the safety of telescoping against objects or pedestrians.

The sensor system deployed inside, on, and outside on the body of the vehicle includes a plurality of sensors, such as radar, lasers, ultrasound devices, infrared devices, Doppler sensors, etc. The sensors provide data to a processor indicating, for example, the vehicle speed, deceleration rate, wind speed, time to impact, distance to an obstacle, etc. Other parameters are pre-determined and stored as data by the vehicle manufacturer such as weight of the vehicle, dimensions of the vehicle, maximum acceleration and deceleration, brake performance, etc.

In one embodiment, an accident avoidance system is disclosed including an image projection system interfaced to a rear surface of an index vehicle. The image projection system is operative to project an image behind the index vehicle. One or more sensors are interfaced to the index vehicle for obtaining sensor data related to a speed of the vehicle, road conditions (e.g. wet, dry, snow-covered, ice-covered), weather (e.g. rain, snow, fog, sleet), ambient lighting conditions (e.g. daylight, darkness, nighttime road lighting), tire pressure, brake wear, etc. The system includes a computer that has preprogrammed data regarding the index vehicle (e.g. brake performance, vehicle weight, stopping ability of the vehicle, and tire configuration). The computer is interfaced to the one or more sensors for obtaining the sensor data that includes at least a speed of the index vehicle. The computer is also coupled to the image projection system for controlling projection of the image. The computer has software that calculates a size of a safety zone based upon the preprogrammed data and the sensor data (including the speed of the vehicle) and then the software controls the image projection system to project an image behind the index vehicle that is proportional to the size of the safety zone.

In another embodiment, a method of avoiding an accident includes measuring a speed of the index vehicle and at least one parameter selected from the group consisting of a road surface type, a road condition, a weather, and tire pressure. A rear safety zone is calculated from the speed of the index vehicle or the delta speed of the index vehicle relative to other vehicles, and at least one preprogrammed parameter related to the vehicle and an image is projected behind the index vehicle. The size of the image projected behind the index vehicle is proportional to the speed of the trailing vehicle, but in some embodiments, the image is not be displayed until the trailing vehicle approaches the rear safety zone defined as the distance needed for safe deceleration of the trailing vehicle. The image provides a visual reference for the vehicle that is following the index vehicle to judge a safe following distance.

In another embodiment, an accident avoidance system is disclosed including an image projection system interfaced to an index vehicle. The image projection system is configured to project an image behind the index vehicle. The system includes one or more sensors that are interfaced to the index vehicle and a computer. The computer has preprogrammed data regarding the index vehicle (e.g. brake performance, vehicle weight, and tire configuration), as well as data regarding an average trailing vehicle. The computer is interfaced to the one or more sensors, obtaining sensor data from the one or more sensors such as sensors that measure a speed of the index vehicle, a speed of a trailing vehicle, road conditions (e.g. wet, dry, snow-covered, ice-covered), weather (e.g. rain, snow, fog, sleet), ambient lighting conditions (e.g. daylight, darkness, nighttime road lighting), tire pressure, brake wear, etc. The computer is operatively coupled to the image projection system for controlling projection of the image. Software is executed by the computer to calculate a size of a safety zone based upon the preprogrammed data and the sensor data and to control the image projection system to project an image behind the index vehicle that is the size of the safety zone.

In another embodiment, the index vehicle is equipped with cameras and sensors that determine the type and specs of the trailing vehicle, such as whether it is a truck, a bus or a minivan to estimate the safe deceleration distance based on published data.

BRIEF DESCRIPTION OF THE DRAWINGS

The invention can be best understood by those having ordinary skill in the art by reference to the following detailed description when considered in conjunction with the accompanying drawings in which:

FIG. 3 illustrates an elevation view of a vehicle with illumination zones of the system for avoiding accidents.

FIG. 4 illustrates a second elevation view of a vehicle with illumination zones of the system for avoiding accidents.

DETAILED DESCRIPTION

Figure 1:
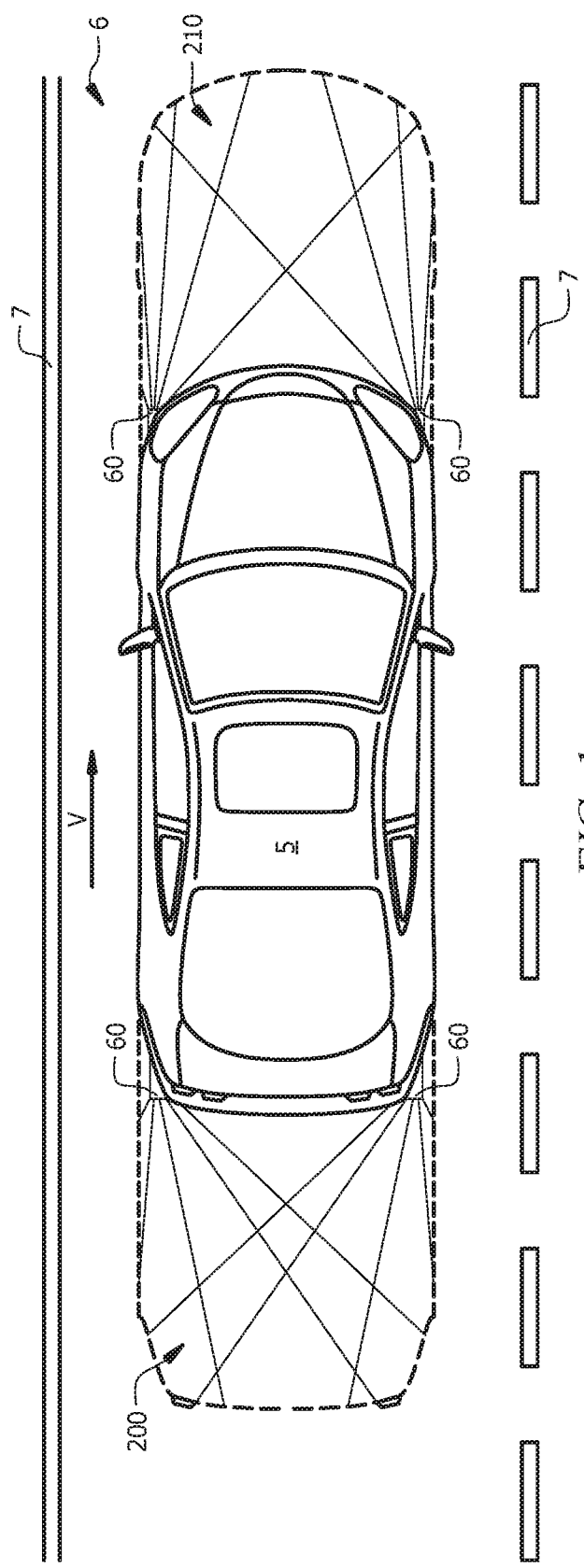
FIG. 1 illustrates a schematic view of a vehicle with illumination zones of the system for avoiding accidents.

Reference will now be made in detail to the presently preferred embodiments of the invention, examples of which are illustrated in the accompanying drawings. Throughout the following detailed description, the same reference numerals refer to the same elements in all figures.

Throughout this description, the term vehicle is any motorized or manually operated vehicle, including, but not limited to, automobiles, motorcycles, bicycles, trucks, boats, etc. Also, throughout this description, the term "index vehicle" is used to identify the vehicle that is equipped with the described system as opposed to the leading vehicle (that which is in front of the index vehicle) or trailing vehicle (that which is behind the index vehicle).

Throughout this description, one typical vehicle control system is used as an example of integrating the system for avoiding accidents into a vehicle. It is fully anticipated that any vehicle control system is present in any target vehicle and the system for avoiding accidents is either integrated into the vehicle control system or operates side-by-side with the vehicle control system or operates independently of the vehicle control system.

Prior art "dynamic imaging" refers to generation of unlimited versions and changing the size and format of images using one master file (Dynamic Media Classic).

The term "dynamic imaging" in this disclosure is defined as imaging of a vehicle that is projected on or above the ground (such as a road) in front, behind or beside the vehicle and has dimensions that increase or decrease depending on parameters such speed of the index vehicle, and speed of a trailing vehicle, as well as the difference (delta) speeds of the index vehicle to other vehicles, in order to provide an accurate visual safety zones surrounding a vehicle. The dynamic image is displayed posteriorly once the trailing vehicle approaches a safety deceleration zone depending on the speed of the trailing vehicle relative to the speed of the index vehicle. Similarly, the dynamic image is displayed anteriorly with dimensions proportional to the speed of the index vehicle once the distance to the vehicle ahead approaches the safety deceleration zone of the index vehicle. The rate of change in the dynamic image dimensions corresponds to acceleration and deceleration. The acceleration and/or deceleration also provide an accurate indicator of the occurrence as well as the severity of a collision. For example, any acceleration or deceleration that exceeds 1.1 g is likely the result of a collision, and the severity increases with the increase in the gravitational force, such as above 10 or 15 g. Note that 1 g of acceleration (or deceleration) is 32 feet per second per second (32 feet per second2). Also note that 0.7 g is possible for a skilled driver braking and as high as 1 g for a skilled driver braking on a dry surface with the best know tires and a very good braking system.

The system for avoiding accidents is based on current theory and concept. Standard safety precautions must always be followed. The persons or corporations implementing the disclosed invention are responsible for providing accurate information to those using this system (drivers), particularly as it pertains to risks versus potential benefits.

Referring to FIGS. 1 through 7, the operation of the system for avoiding accidents will be explained. In order to avoid accidents, it is important to maintain a safe distance between vehicles in order to provide sufficient time to react to unexpected events such as an animal entering the roadway, traffic congestion, etc. Many people use one car-length per ten miles per hour of speed as a rule of thumb. This is a good rule, but it is often difficult for a driver to judge the length of a car. Further, the stopping time of a vehicle varies based upon factors other than speed of the vehicle such as tire condition, road conditions, temperature, etc. So, even if there was a way for a driver to accurately judge six car lengths when driving at 60 miles per hour, more space is required when it is raining, icy, on gravel road, when one's tires are worn, etc.

To overcome the inaccuracies and misjudgments of having the driver continuously judge an appropriate distance, the system for avoiding accidents calculates the appropriate distances based upon various data and sensor data and projects either a hologram or a flat image on a roadway surface 6 showing the suggested distances between vehicles. Note that there is no limitation on the type of roadway surface ranging from asphalt, concrete, gravel, sand, grass fields, cobble stone, etc., each having different stopping characteristics.

In FIGS. 1-7, an index vehicle 5 is shown traveling on the roadway surface 6 (for clarity, in FIGS. 1-6, the index vehicle 5 is traveling generally from left to right within a lane between lane markers 7). In FIG. 1, a rear safety zone 200 and a front safety zone 210 are projected by one or more projectors 60, typically laser projectors. A size of the front safety zone 210 and the rear safety zone 200 is determined by a processor 70 (see FIG. 9) analyzing stored data (e.g. vehicle weights, vehicle dimensions, vehicle stopping distance on dry pavement, tire age . . . ) and data from one or more sensors such as a camera 93, microphone 95, ambient light sensor 50, roadway condition sensor 48, speed sensor 40, etc. (see FIG. 9). The processor then controls the one or more projectors 60 to project an image or outline on the pavement that represents a safe inter-vehicle distance based upon the stored data and data from the sensors. For example, if based upon the stored data, the stopping distance of the index vehicle 5 at 60 miles per hour is 80 feet on dry pavement, and then the front safety zone 210 will be projected on the road, occupying approximately 80 feet in front of the index vehicle 5. If it is determined from the data from the sensors that the road is wet (e.g. from rain), then a greater stopping distance is calculated based upon the wet surface and, for example, a the front safety zone 210 will be projected on the road, occupying, for example, approximately 120 feet in front of the index vehicle 5.

Similarly, for example, if based upon the stored data, the stopping distance of a trailing vehicle at 60 miles per hour is 80 feet on dry pavement, then the rear safety zone 200 will be projected on the road, occupying approximately 80 feet behind the index vehicle 5. If it is determined from the data from the sensors that the road is wet (e.g. from rain), then a greater stopping distance for the trailing is calculated based upon the wet surface and, for example, a the posterior safety zone will be projected on the road, occupying, for example, approximately 120 feet behind the index vehicle 5. The image is projected once the trailing vehicle approaches the safety deceleration zone of an average trailing vehicle based on its speed and road conditions.

Figure 2:
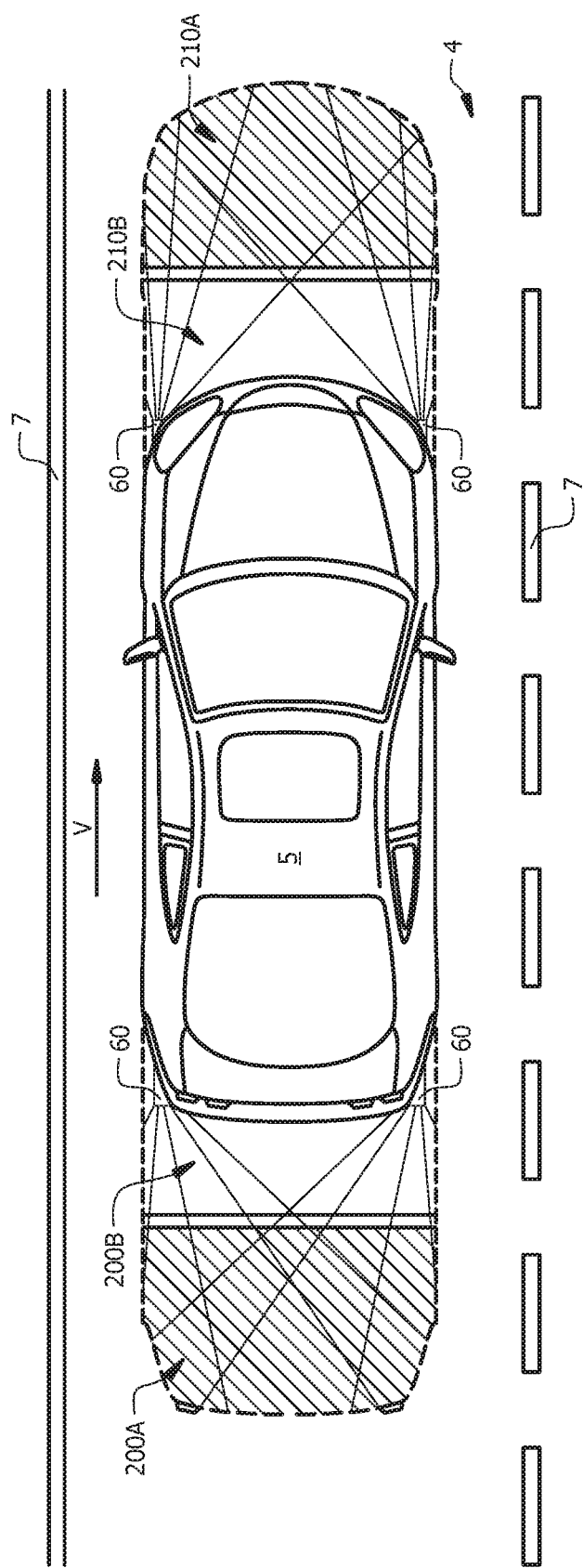
FIG. 2 illustrates a second schematic view of a vehicle with illumination zones of the system for avoiding accidents.

In some embodiments, the rear safety zone 200 and a front safety zone 210 are projected by one or more projectors 60 that have the ability to project multiple colors, typically laser projectors. In FIG. 2, the rear safety zone 200 includes two differently colored/shaded areas, a warning area 200A and a danger area 200B. For example, the warning area 200A is projected in yellow and a danger area 200B is projected in red. Likewise, also in FIG. 2, the front safety zone 210 includes two differently colored/shaded areas, a warning area 210A and a danger area 210B. For example, the warning area 210A is projected in yellow and a danger area 210B is projected in red. There is no limitation on the colors used, the number of zones, the use of patterns instead of colors, etc.

In FIG. 3, a side elevation view of the projection of the front safety zone 210 and the rear safety zone 200 is shown.

In FIG. 4, a side elevation view of the projection of the front safety zone hologram 230 and the rear safety zone hologram 220 is shown. In this example, holograms 220/230 are projected in the space in front and behind the index vehicle 5 to provide an image of a larger vehicle to better warn the driver of a safe following distance and to better warn other drivers of a safe distance between those driver's vehicles and the index vehicle 5. In this example, hologram projectors 62 project the front safety zone hologram 230 and the rear safety zone hologram 220 under control of the processor 70.

Figure 5:
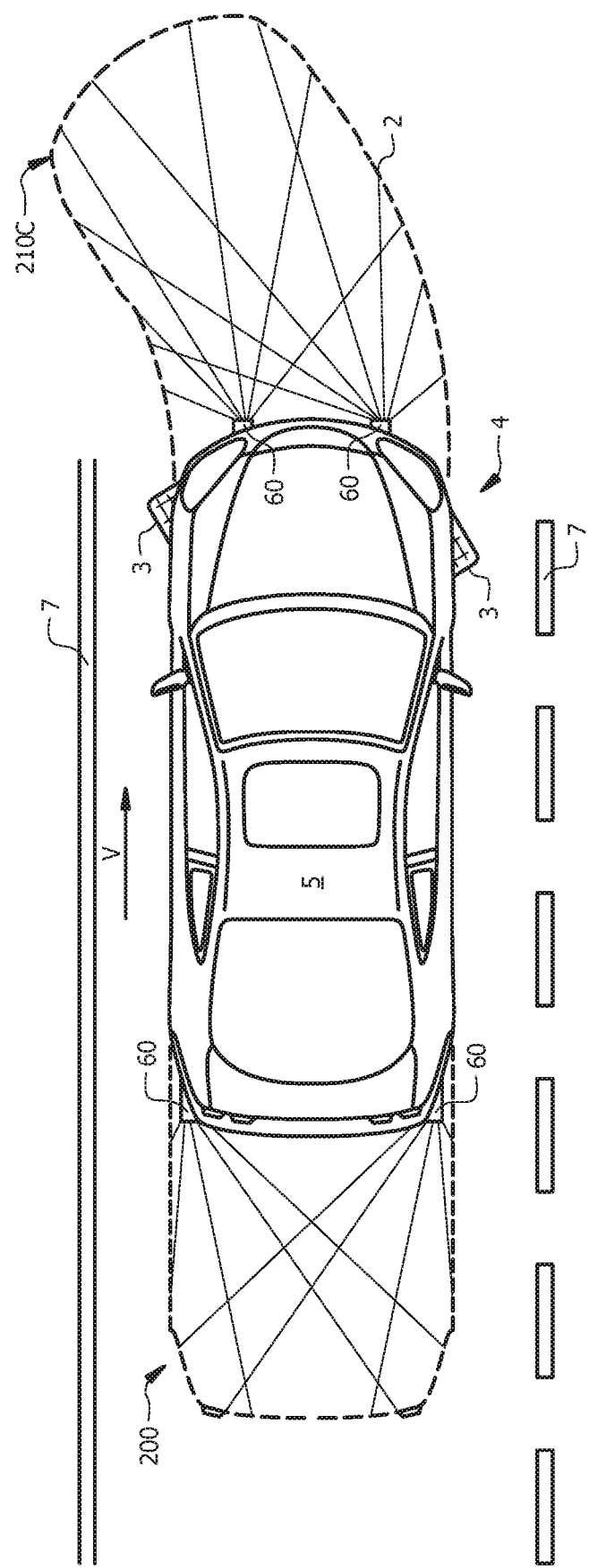
FIG. 5 illustrates a third schematic view of a vehicle with illumination zones of the system for avoiding accidents.

In FIG. 5, it is shown how the front safety zone 210 changes shape into a curved front safety zone 210C as the driver turns the steering wheel of the index vehicle 5, as shown by the front tires 3 being at an angle with respect to the traveling direction of the index vehicle 5. In this, the curved front safety zone 210C is shaped and sized to warn others, including pedestrians, and to warn the driver of the index vehicle 5 as to the path of the index vehicle 5 and how much space is required for the index vehicle 5 to safely stop.

Figure 6:
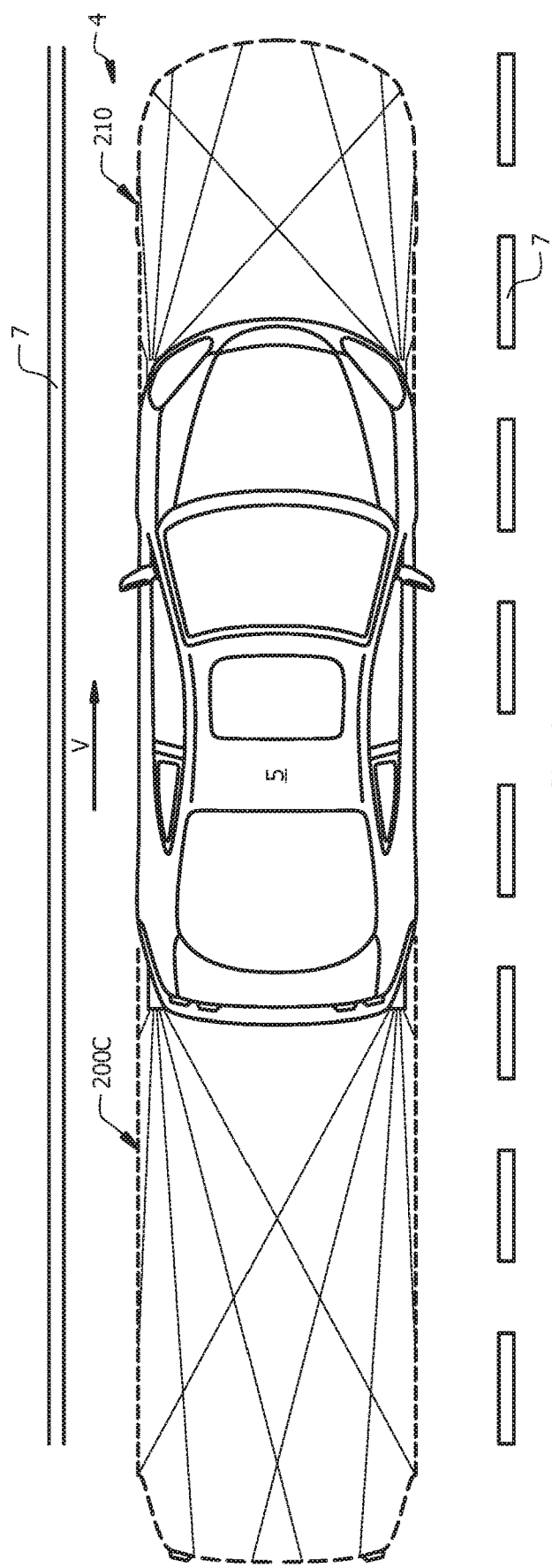
FIG. 6 illustrates a fourth schematic view of a vehicle with illumination zones of the system for avoiding accidents.

In FIGS. 1-4, the rear safety zone 200 and a front safety zone 210 are projected by one or more projectors 60 or hologram projectors 62 based upon a first set of data. The processor controls the one or more projectors 60 and/or hologram projectors 62 to project an image or outline on or above the pavement that represents a safe inter-vehicle distance based upon the stored data and data from the sensors (e.g. a flat image on the pavement or a holographic image above the pavement). For example, in FIGS. 1-4, the rear safety zone 200 is of a size based upon the stored data, the stopping distance of the index vehicle 5 at a first set of conditions (e.g. speed, pavement type, pavement conditions, tire conditions, etc.). In FIG. 6, a longer rear safety zone 200C is projected on the road surface 4, informing following vehicles that more inter-vehicle stopping distance is needed between the following vehicle and the index vehicle 5, based upon current conditions.

Again, the size of the rear safety zone 200 and a front safety zone 210 as projected by one or more projectors 60 or hologram projectors 62 is dependent upon various stored data and measured data from sensors. In one example, one of the sensors is an accelerometer 51 (see FIG. 9). In such, the acceleration of the index vehicle 5 is readily available. Using data from the accelerometer 51 provides the processor 70 and algorithms knowledge of whether the index vehicle 5 is accelerating or decelerating. Further, in examples in which a camera 93, radar system 44, or sonar system 46 are available, the processor 70 and algorithms have knowledge of whether the surrounding vehicles are accelerating or decelerating with respect to the index vehicle 5. This will provide warning to the driver of the index vehicle 5 of an imminent collision, for example, if the index vehicle 5 is decelerating (as determined by the accelerometer 51) and the following vehicle is accelerating (as determined by one or more of a camera 93, a radar system 44, or a sonar system 46. The radar system 44, sonar system 46, and/or the camera(s) 92 are also used to determine a distance between the vehicle and other vehicles/objects.

Further, in embodiments having an accelerometer 51, there are anticipated embodiments in which the processor 70 and algorithms determine if a collision has occurred with a high degree of accuracy, including (also in some embodiments) the location of the collision and the severity of the collision. Knowledge of a collision is derived from instantaneous acceleration (or deceleration) in any direction. Given current technology, the fastest car acceleration in 2017 was about 0 to 60 miles per hour in 2.5 seconds, which represents around about 1.09 g (one g is the acceleration due to gravity at the Earth's surface defined as 9.80665 meters per second squared, or 9.80665 newtons of force per kilogram of mass). Therefore, acceleration greater than 1.1 g is likely to have been caused by a collision as such acceleration is not likely given most vehicle technology. Similarly, most vehicles have a maximum deceleration of less than 1.0 g, by experienced drivers on dry road conditions, and with good tires. A deceleration greater than 1.1 g is likely caused by a collision. Thus, any acceleration or deceleration of greater than 1.1 g defines a collision with a high likelihood of certainty. Such a collision is detected instantaneously at the time of occurrence. In some embodiments, notification of the collision is transmitted through the wide-area transceiver 17, and, in some embodiments, is reported to the appropriate authorities for immediate action. In addition, to the detection of the collision, in some embodiments, the magnitude of acceleration and/or deceleration and impact is also transmitted. For example, an absolute acceleration value or an arbitrary classification of the collision: moderate, severe, or potentially lethal depending on the acceleration/deceleration. For example, a moderate is between 1.1 g and 5 g; a severe collision is between 5 g and 10 g; and a potentially lethal collision is anything over 10 g. For some vehicles such as race cars, a potentially lethal deceleration may exceed 50-200 g.

"The highest recorded G-force experienced by a human who survived was during the 2003 IndyCar Series finale at Texas Motor Speedway on Oct. 12, 2003 in the 2003 Chevy 500 when the car driven by Kenny Bräck made wheel-to-wheel contact with Tomas Scheckter's car. This immediately resulted in Bräck's car impacting the catch fence that would record a peak of 214 g." (Wikipedia)

The notification, including the magnitude of the collision, is important since severe collisions often require emergency medical services to save lives and minimize disability while a low impact fender bender collision often only requires exchange of information between those involved and/or arrival of a law enforcement person. Further, using the positioning system 91, in some embodiments, the location of the collision is also reported through the wide-area transceiver 17.

In all embodiments, it is anticipated that the image projection using the projectors 60 or the hologram projectors 62 are only activated when needed to warn of less-than-desirable or dangerous inter-vehicle (or inter-object) spacing. For example, if another vehicle is 200 feet behind the index vehicle 5, then the image projection using the projectors 60 or the hologram projectors 62 are not activated. The image projection using the projectors 60 or the hologram projectors 62 is initiated, for example, when the inter-vehicle spacing is less than what is deemed safe based upon the present conditions, including, for example, vehicle speeds, road conditions, tire conditions, vehicle data, reaction times, etc. For example, if the index vehicle 5 is moving at 60 mph and a trailing vehicle is moving at 70 mph, the delta speed is negative 10 mph. Any values less than zero indicates that the inter-vehicle distance is reducing and the trailing vehicle is catching up to the index vehicle 5. The projectors 60 or the hologram projectors 62 are activated to project the rear safety zone 200/200A/200B/200C once the trailing vehicle approaches the danger zone (or warning zone). It should be noted that the dimensions of the rear image of the index vehicle is proportional to the speed of the trailing vehicle, but image projection is activated only when the trailing vehicle approaches the safety deceleration distance of an average vehicle with adequate tires, braking systems, etc. On the other hand, if the index vehicle 5 is moving at 70 mph and a trailing vehicle is moving at 60 mph, the delta speed is positive 10 mph. Any values greater than zero indicates that the inter-vehicle distance is increasing and the trailing vehicle is getting further away from the index vehicle 5. In this example, once the inter-vehicle distance is greater than the danger zone, the projectors 60 or the hologram projectors 62 are deactivated. Once the index vehicle 5 approaches a leading vehicle (one in front of the index vehicle 5), the roadway projecting devices 60 or the hologram projectors 62 are activated to project the front safety zone 210/210A/210B/210C to warn the driver of the index vehicle 5 not to follow the leading vehicle too closely.

Figure 7:
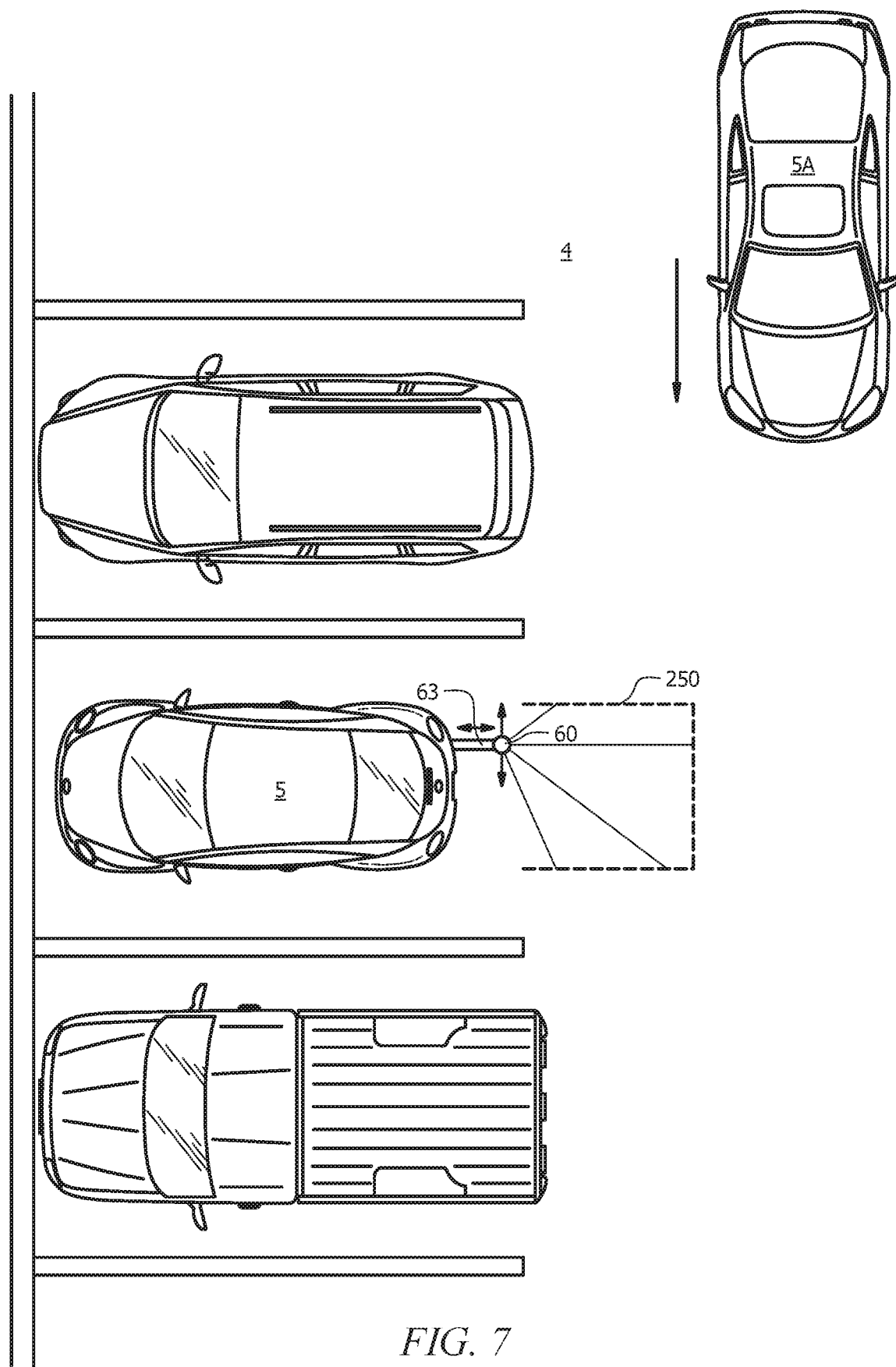
FIG. 7 illustrates a fifth schematic view of a vehicle with illumination zones of the system for avoiding accidents.

Referring to FIG. 7, a telescoping assembly 63 is shown extending from the rear of the index vehicle 5. As it is often difficult to back out of a parking space, the telescoping assembly 63 includes a projector that provides a projection 250 on the surface behind the index vehicle 5 that warns a driver of an approaching vehicle 5A as to where the index vehicle 5 will be traveling. Further, in some embodiments, the telescoping assembly 63 includes one or more cameras/lenses that image the parking area. The images from the cameras are then displayed, for example, on the dashboard display (see FIG. 9) to warn the driver of the index vehicle 5 that approaching vehicle 5A is near. In a preferred embodiment, the telescoping assembly 63 is either flexible or is hinged to reduce the chance of damage should an object come into contact with the telescoping assembly. In some embodiments, the telescoping assembly 63 includes sensors for detecting objects in the rearward path of the index vehicle 5 and to limit extension of the telescoping assembly 63 so as not to hit such objects.

Figure 8:
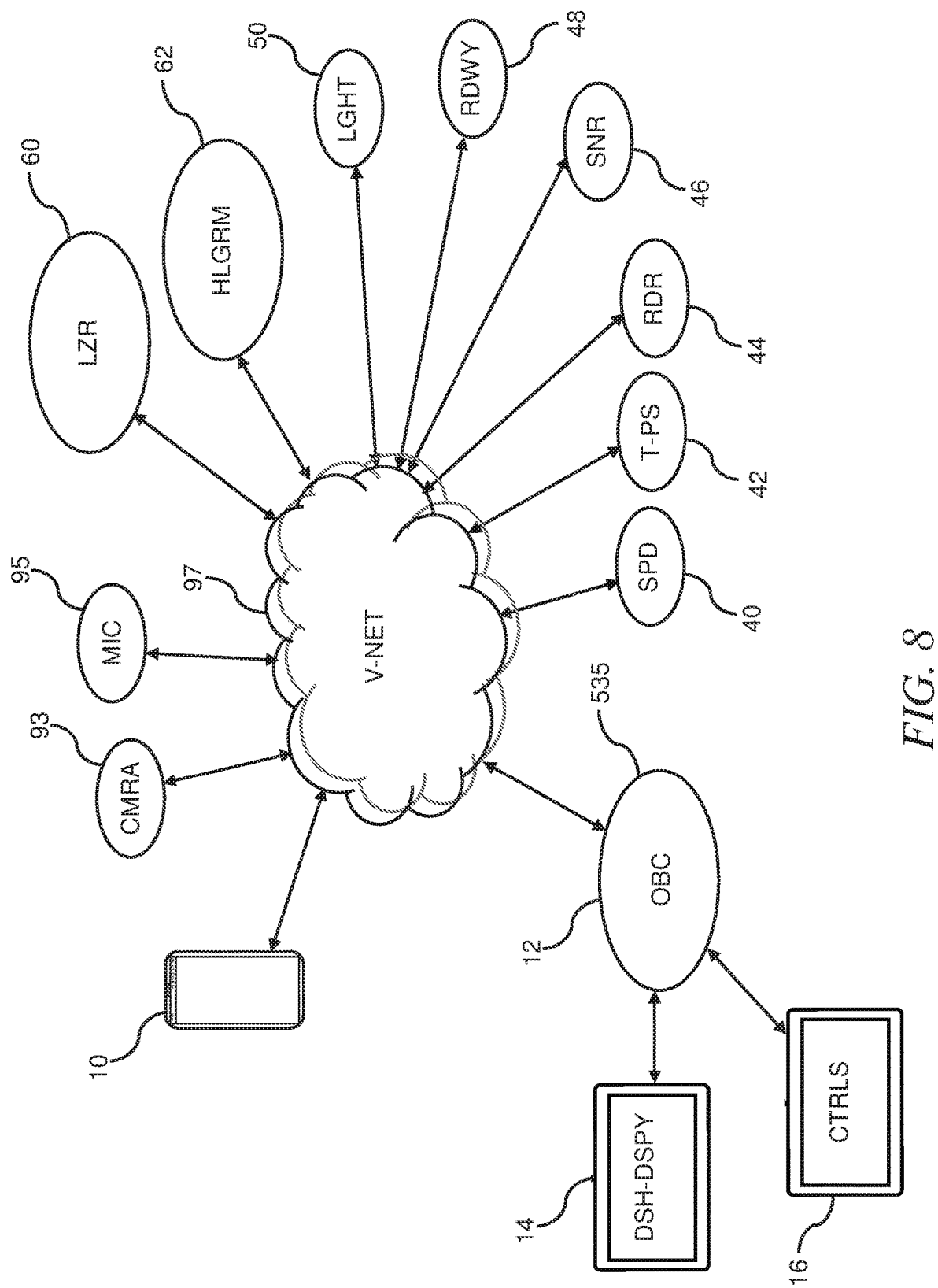
FIG. 8 illustrates a data connection diagram of the system for detecting collisions.

Referring to FIG. 8, a data connection diagram of the exemplary system for avoiding accidents is shown. In this example, an on-board computer 12 (or any computing entity), communicates through a vehicle network 97 (e.g. car-area network or CAN, vehicle-area network or VAN, etc.) to various entities, some or all of which are included of the exemplary system for avoiding accidents.

As will be shown, the on-board computer 12 communicates with various input devices or sensors to obtain information regarding the speed of the vehicle, vehicle conditions, road conditions/weather, surrounding vehicles, etc. In this example, the input devices or sensors include, but are not limited to, a speed sensor 40, one or more tire pressure sensors 42, a radar system 44 (e.g. for sensing positions and speeds of other vehicles), a sonar system 46 (e.g. also for sensing positions and speeds of other vehicles, a roadway condition sensor 48 (e.g. for sensing the type of roadway and/or road conditions such as wet, dry, snow-covered, ice-covered, an ambient light sensor 50 (e.g. for determining ambient light), one or more cameras 93 (e.g. for sensing objects, other vehicles, etc.), and a microphone 95 (e.g. for measuring road noise to determine type of road surface). The on-board computer 12 also communicates with projecting devices 60/62. The projecting devices 60/62, under control of the on-board computer 12, project an image either onto the roadway (e.g. a laser projecting device) or into the space above the roadway (e.g. a holographic projecting device 62). It is anticipated that either or both of the projecting devices 60/62 are used in any embodiment of this invention.

For completeness, the vehicle network 97 (or the on-board computer 12) communicates with external devices 10 (e.g. a cellular phone or a maintenance computer) either by direct connection through a service connector (not shown, but known in the industry) or through a wireless interface such as Bluetooth through a Bluetooth radio transceiver 94 (see FIG. 2) or Wi-Fi through a Wi-Fi radio transceiver 96 (see FIG. 2).

In a preferred embodiment, the on-board computer 12 interfaces to a dashboard display 14 (e.g., gauges, illuminating icons, graphics display, etc.) for displaying various information and to one or more controls 16 (e.g. accelerator, brakes, switchers).

In some embodiments, a wide-area transceiver 17 is included for communicating with external systems through, for example, the cellular network. When present, the wide-area transceiver 17 is capable of transmitting location information from the positioning system 91 to a remote location, automatically, in the event of an accident. In some embodiments, the wide-area transceiver 17 operates on a dedicated wide-area network or on a public wide-area network such as communicating with cell towers in a cellular network.

In some embodiments, an accelerometer 51 is included to measure vehicle acceleration and deceleration (negative acceleration). The accelerometer 51, when present, will be used, for example, to determine if a collision has occurred, for example when a reading from the accelerometer 51 exceeds 1.1 g.

Figure 9A:
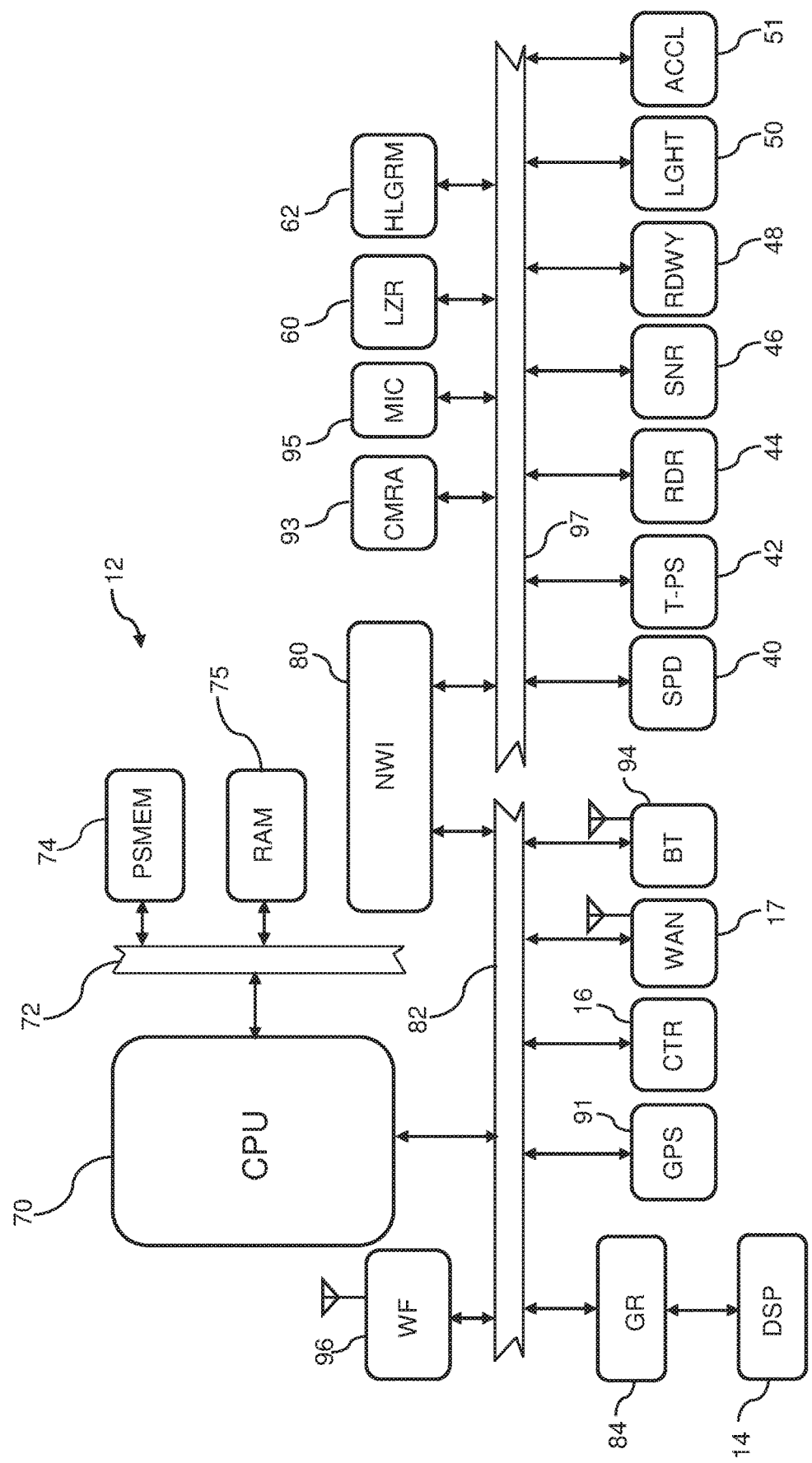
FIG. 9A illustrates a schematic view of the system for detecting collisions.

Referring to FIG. 9A, a schematic view of a typical computing system of the exemplary system for detecting collisions is shown. Although any computing entity is anticipated, for clarity purposes, an on-board computer 12 is shown.

The exemplary system for detecting collisions is described using a processor-based on-board computer 12 that also provides standard vehicle-wide operation as known in existing vehicles. The present invention is in no way limited to using the on-board computer 12 to perform calculations, measure data, and/or calculate image projections, as any computing entity is anticipated. The on-board computer 12 is shown as one way of implementing the present application utilizing existing computational power within the vehicle. It is fully anticipated that different architectures are known that accomplish similar results in a similar fashion and the present invention is not limited in any way to any particular vehicular architecture or implementation.

In this example, a processor 70 executes or runs programs in a random-access memory 75. The programs are generally stored within a persistent memory 74 and loaded into the random-access memory 75 when needed. The processor 70 is any processor, typically a processor designed for vehicles.

The persistent memory 74 and random-access memory 75 are connected to the processor by, for example, a memory bus 72. The random-access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, etc. In some exemplary on-board computers 12, the persistent memory 74 is removable, in the form of a memory card of appropriate format such as SD (secure digital) cards, micro SD cards, compact flash, etc.

Also, connected to the processor 70 is a system bus 82 for connecting to peripheral subsystems such as a graphics adapter 84 and an input interface to various controls 16. The graphics adapter 84 receives commands from the processor 70 and controls what is depicted on the dashboard display 14. The controls 16 provide navigation and selection of vehicle features (e.g. turn signals, audio controls, horn, etc.).

In general, some portion of the persistent memory 74 is used to store programs, executable code, and data, etc. It is anticipated that the data includes one or more specification parameters regarding the vehicle such as weight, stopping distance, acceleration parameters, length, width, tire tread data, tire tread wear predictions, etc. In some embodiments, this data is used to determine the safety zone around the vehicle. In some embodiments, other data is stored in the persistent memory 74 such as audio files, video files, text messages, etc.

In some embodiments, positioning system 91 (e.g. a global positioning or GPS system) is interface to the system bus 82. In some embodiments, the exemplary system for detecting collisions utilizes data from the positioning system 91 to determine speed/velocity of the vehicle, time-of-day, road type, etc.

In many embodiments of the present invention, a Bluetooth radio transceiver 94 and/or a Wi-Fi radio transceiver 96 are included for communicating with other devices or with peripherals/sensors that are interfaced to the vehicle.

As known in the industry, many vehicles utilize a vehicle network 97 (e.g. car-area network or CAN, vehicle-area network or VAN, etc.) for communicating with various entities, some or all of which are included of the exemplary system for avoiding accidents. In this example, a vehicle network interface 80 interfaces between the system bus 82 and the vehicle network 97 (e.g. car-area network or CAN, vehicle-area network or VAN, etc.).

In this example, the input devices or sensors include, but are not limited to, a speed sensor 40, one or more tire pressure sensors 42, a radar system 44 (e.g. for sensing positions and speeds of other vehicles), a sonar system 46 (e.g. also for sensing positions and speeds of other vehicles), a roadway condition sensor 48 (e.g. for sensing the type of roadway and/or moisture on the roadway), an ambient light sensor 50 (e.g. for determining ambient light, daytime, night, dawn, dusk), one or more cameras 93 (e.g. for sensing objects, other vehicles, etc.), and one or more microphones 95 (e.g. for measuring road noise to determine type of road surface). The on-board computer 12 also communicates through the vehicle network 97 with projecting devices 60/62 for projecting an image either onto the roadway (e.g. a roadway projecting device 60) or into the space above the roadway (e.g. a holographic projecting device 62). It is anticipated that either or both of the projecting devices 60/62 are used in any embodiment of this invention.

Figure 9B:
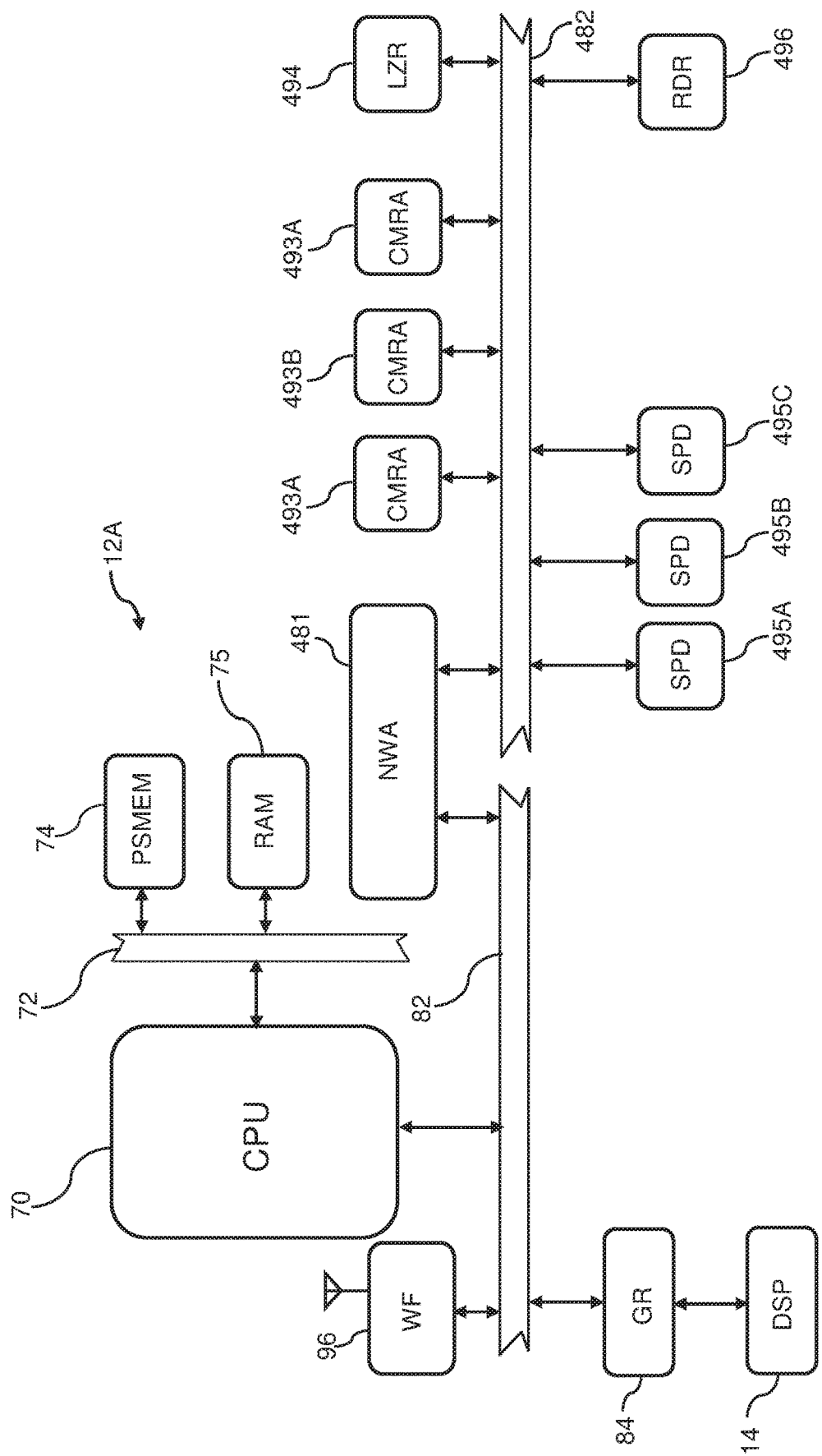
FIG. 9B illustrates a schematic view of the system for detecting collisions.

Referring to FIG. 9B, a schematic view of a typical municipal computing system of the exemplary system for detecting collisions is shown. Although any computing entity is anticipated, for clarity purposes, a general-purpose computer 12A is shown.

The exemplary system for detecting collisions is described using a computer 12A for providing standard municipal monitoring including, but not limited to, for example, gathering roadway performance data (average vehicle speed, congestion, etc.). The computer 12A is used to switch images on displays, to perform calculations, measure data, and/or calculate probable collisions per the present application. The computer 12A is shown as one way of implementing the present application utilizing existing computational power within the vehicle. It is fully anticipated that different architectures are known that accomplish similar results in a similar fashion and the present invention is not limited in any way to any particular vehicular architecture or implementation.

In this example, a processor 70 executes or runs programs in a random-access memory 75. The programs are generally stored within a persistent memory 74 and loaded into the random-access memory 75 when needed. The processor 70 is any processor, typically a processor designed for vehicles. The persistent memory 74 and random-access memory 75 are connected to the processor by, for example, a memory bus 72. The random-access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, etc. In some exemplary on-board computers 12, the persistent memory 74 is removable, in the form of a memory card of appropriate format such as SD (secure digital) cards, micro SD cards, compact flash, etc.

Also, connected to the processor 70 is a system bus 82 for connecting to peripheral subsystems such as a graphics adapter 84 and an input interface to various controls 16. The graphics adapter 84 receives commands from the processor 70 and controls what is depicted on the display 14 (e.g. at a traffic monitoring station).

In general, some portion of the persistent memory 74 is used to store programs, executable code, and data, etc. It is anticipated that the data includes one or more specification parameters regarding the collision detection parameters. In some embodiments, this data is used by algorithms for detecting collisions; other data is also stored in the persistent memory 74 such as audio files, video files, text messages, etc.

In many embodiments of the present invention, a Wi-Fi radio transceiver 96 is included for communicating with other devices, for example, for alerting of a collision that was just detected.

As known in the industry, there are many mechanisms for communicating camera and sensor data to the processor 70. In this exemplary embodiment, a network interface adapter 80 interfaces between the system bus 82 and a local area network 482 (e.g. Ethernet).

In this example, the input devices or sensors include, but are not limited to, in-road speed sensors 495A/495B/495C, one or more radar speed monitoring systems 496 (e.g. for sensing positions and speeds of vehicles on the road being monitored), one or more cameras 493A/493B/493C (e.g. for sensing vehicle accelerations and decelerations, etc.), one or more laser speed monitoring systems 494 (e.g. for sensing positions and speeds of vehicles on the road being monitored). In some embodiments, one or more of the cameras 493A/493B/493C are integrated or deployed in a hovering aircraft such as a drone 401 or helicopter, for example, camera 493A shown in FIG. 3. In some embodiments, one or more of the cameras 493A/493B/493C are integrated or deployed in an overhead pole 403 and/or fixture 405 such as camera 493B shown in FIG. 4.

Although specific numbers of each sensor/camera are shown, any number (including zero) is anticipated. The in-road speed sensors 495A/495B/495C are, for example, spaced apart magnetic mass detectors as used currently for traffic monitoring. As vehicles pass over the in-road speed sensors 495A/495B/495C, a signal is generated, so that, monitoring subsequent in-road speed sensors 495A/495B/495C enables measuring of the speed of a vehicle passing over such in-road speed sensors 495A/495B/495C.

Figure 10A:
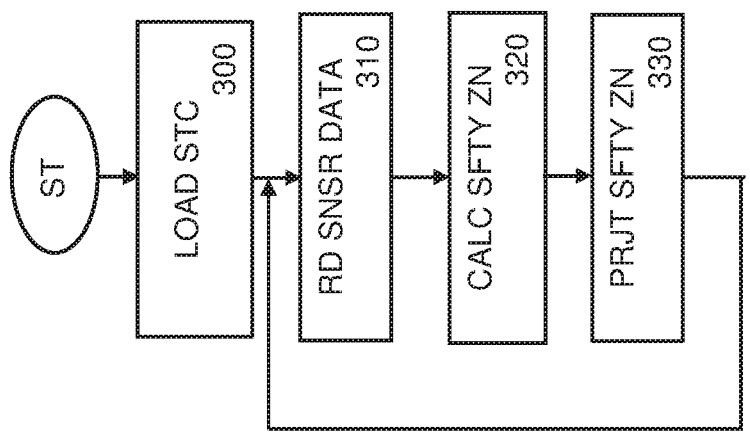
FIG. 10A illustrates a first flow chart of the system for detecting collisions.
Figure 10B:
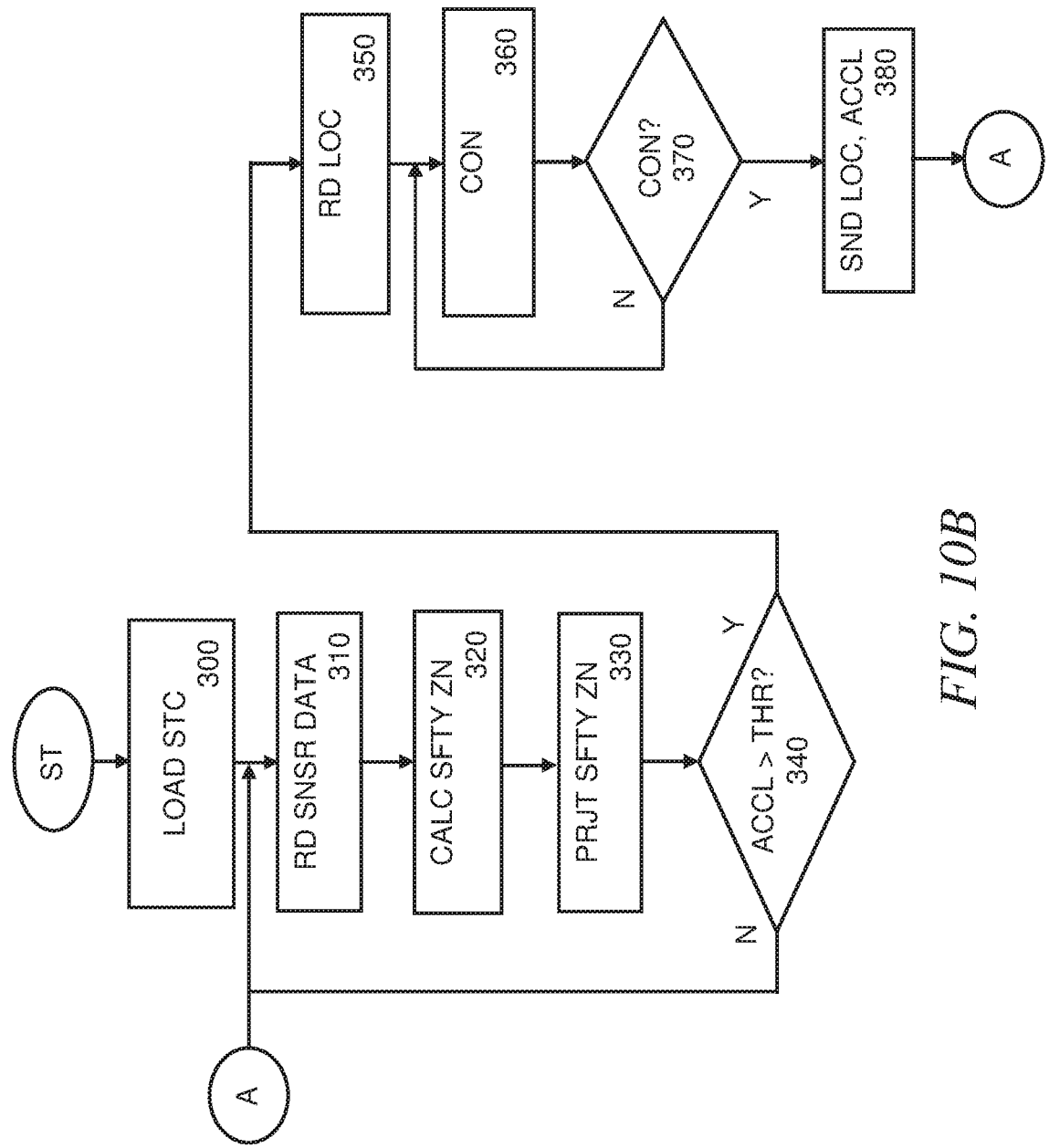
FIG. 10B illustrates a second flow chart of the system for detecting collisions.

Referring to FIGS. 10A and 10B exemplary flow charts of the system for detecting collisions are shown. In both examples, software running on the processor 70 reads 300 static data such as the vehicle weight, vehicle braking power, vehicle acceleration ability, vehicle dimensions, etc. The static data is typically preprogrammed and stored in persistent memory 74. The software then enters a loop. Each time through the loop, the software reads 310 sensor data from one or of the sensors, for example, the speed sensor 40, one or more tire pressure sensors 42, the radar system 44 (e.g. for sensing positions and speeds of other vehicles), the sonar system 46 (e.g. also for sensing positions and speeds of other vehicles, the roadway condition sensor 48 (e.g. for sensing the type of roadway and/or moisture on the roadway), the ambient light sensor 50 (e.g. for determining ambient light), one or more cameras 93 (e.g. for sensing objects, other vehicles, etc.), and/or the microphone 95 (e.g. for measuring road noise to determine type of road surface). From the stored data and the sensor data, the software calculates 320 each of the safety zones (e.g. the safe inter-vehicle distance) and then projects 330 the safety zones, for example in front and behind the index vehicle 5.

In FIG. 10B, an additional test 340 is performed to determine if the acceleration (or deceleration) is greater than a predetermined threshold (e.g. greater than 1.1 gravitational forces). Note that it is anticipated that there be different thresholds for each directional axis of the index vehicle 5. For example, one threshold for acceleration, another threshold for deceleration, and still another for sideways acceleration in either direction. If the test 340 determines that the acceleration (or deceleration) is not greater than a predetermined threshold, the loop continues. If the test 340 determines that the acceleration (or deceleration) is greater than a predetermined threshold, a notification step is initiated. Although there are many ways anticipated to notify, in the example shown, the software reads 350 the location of the index vehicle 5 (e.g. from the positioning system 91) then initiates a connection 360 to a remote system. A test 370 is made to determine if the connection succeeded. If the test 370 determines that the connection failed, the initiation of the connection 360 is repeated until the test 370 determines that the connection succeeded, after which data is sent 380 to the remote system. The data that is sent 380 includes, for example, an identification of the vehicle, the location, the peak measured acceleration or deceleration, the time, other conditions as read by the sensors, etc. The remote system, upon receiving the data, reviews the data to determine what type of response needs to be made. For example, if the acceleration or deceleration is very high, an ambulance or life-flight is dispatched. If the acceleration or deceleration is low, an officer is dispatched, etc.

Figure 10C:
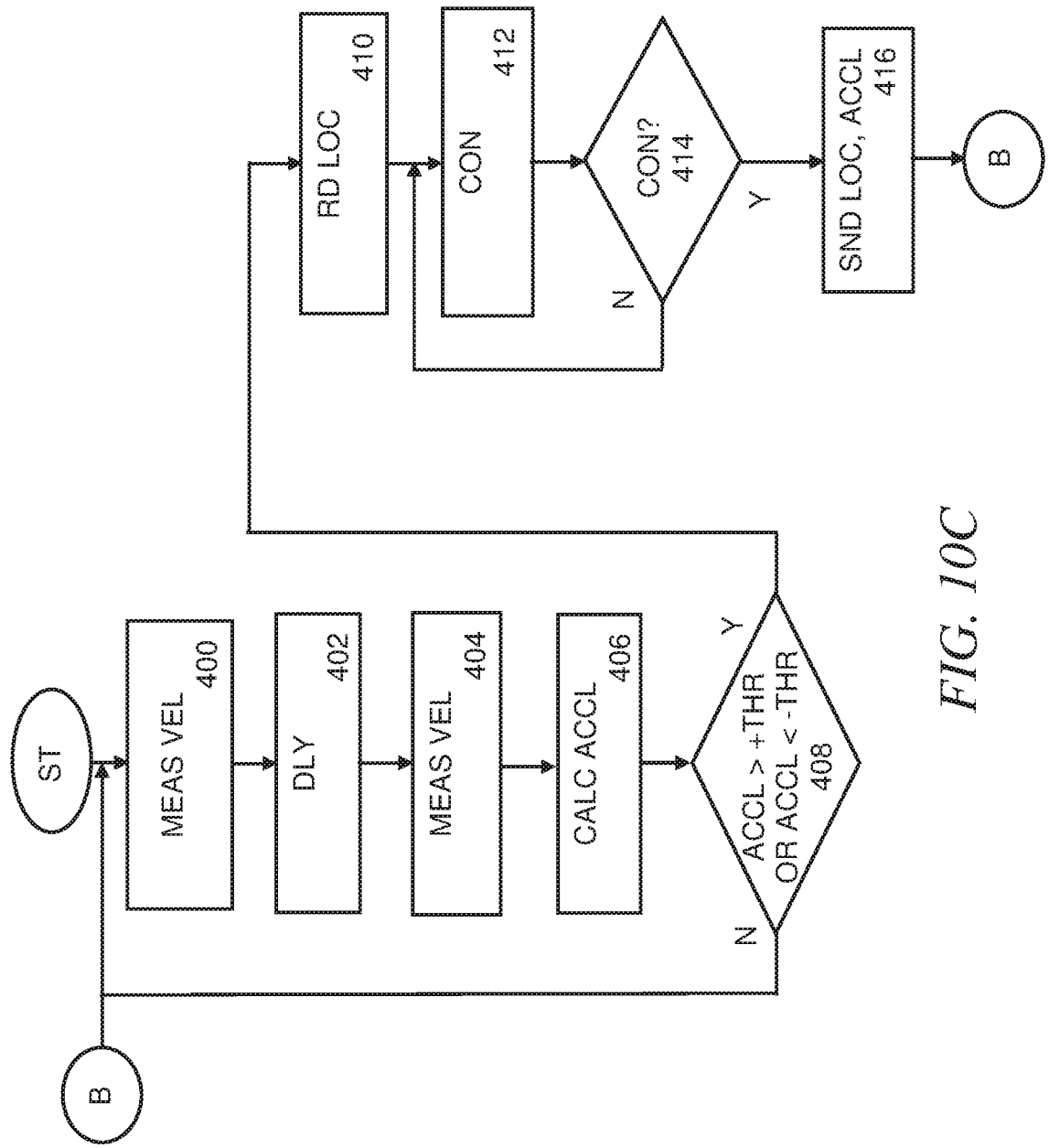
FIG. 10C illustrates a third flow chart of the system for detecting collisions.

FIG. 10C illustrates a third flow chart of the system for detecting collisions. The exemplary algorithm shown in FIG. 10C is anticipated to be performed by an on-board computer 12, an external device 10 (e.g. cellphone), a municipal computer 12A, or any other processor. The algorithm starts by measuring the first velocity (speed) 400 of a vehicle by any mechanism available such as using GPS, using a speed sensor 40, radar 496/laser 494, in-road sensors 495A/495B/495C, etc. Next, a fixed time delay is performed 402, then the new velocity (speed) 404 of the vehicle is measured by any mechanism available. An acceleration value is calculated 406 ((first velocity-second velocity)/fixed time). Note the acceleration is anticipated to be either positive or negative (deceleration). Now a test 408 is performed to determine if the acceleration is greater than a predetermined acceleration threshold or the deceleration is less than a pre-determined deceleration threshold (e.g. an acceleration or deceleration greater than 1.1 gravitational forces). Note that it is anticipated that there be different thresholds for each directional axis of the index vehicle 5. For example, one threshold for acceleration, one threshold for deceleration, and still another threshold for sideways acceleration in either direction. If the test 408 determines that the acceleration (or deceleration) is not greater than the predetermined threshold or less than the pre-determined deceleration threshold, the loop continues (B). If the test 408 determines that the acceleration (or deceleration) is greater than the predetermined threshold or less than the pre-determined deceleration threshold, a notification step is initiated. Although there are many ways anticipated to notify, in the example shown, the software reads 410 the location of the index vehicle 5 from, for example, the positioning system 91 then initiates a connection 412 to a remote system. A test 414 is made to determine if the connection succeeded. If the test 414 determines that the connection failed, the connection 412 is repeated until the test 414 determines that the connection succeeded. After a successful connection, data is sent 416 to the remote system. The data that is sent 416 includes, for example, an identification of the vehicle, the location, the peak measured acceleration or deceleration, the time, other conditions as read by the sensors, etc. The remote system, upon receiving the data, reviews the data to determine what type of response needs to be made. For example, if the acceleration or deceleration is very high, an ambulance or life-flight is dispatched. If the acceleration or deceleration is low, an officer and maybe a tow truck is dispatched, etc.

Figure 10D:
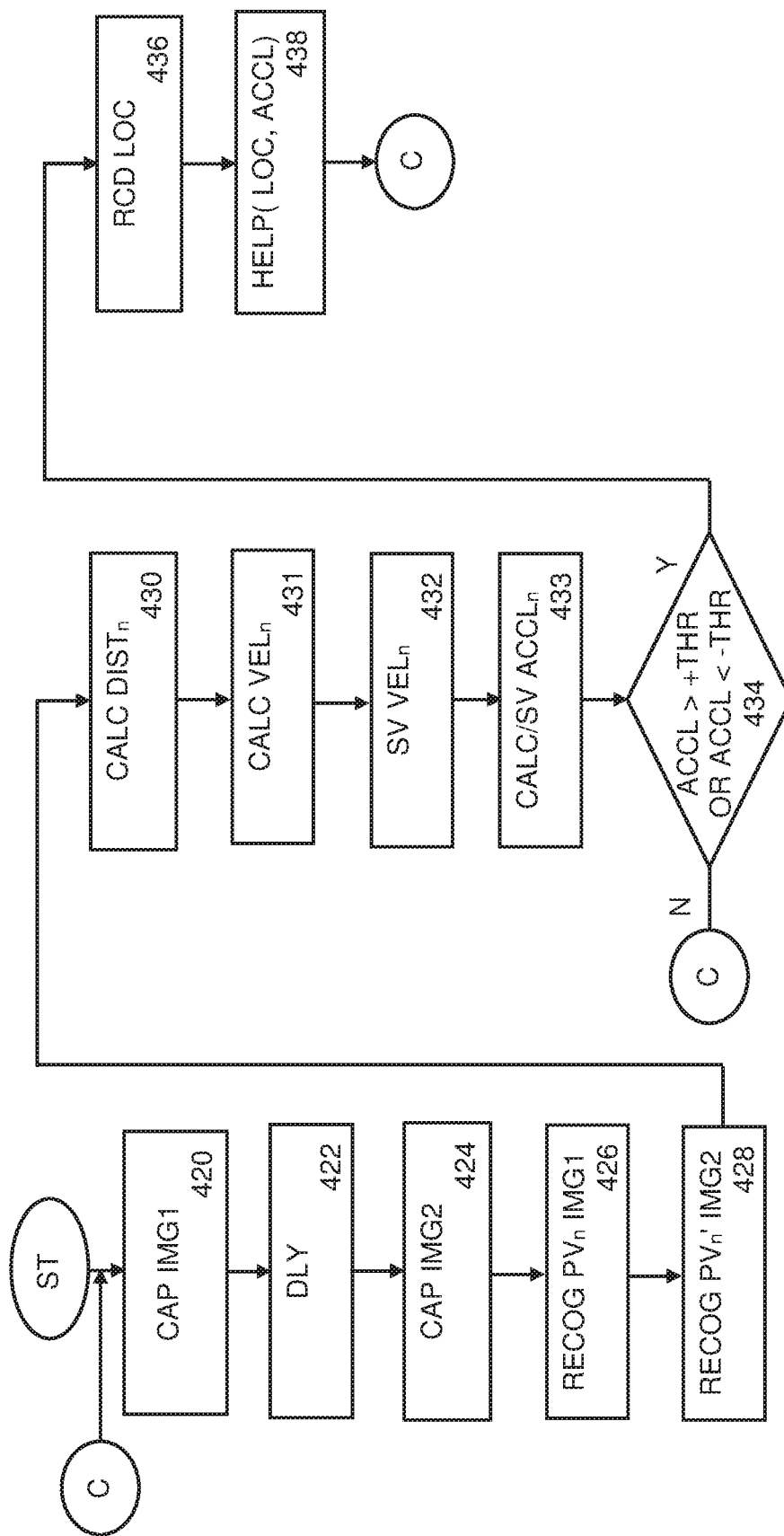
FIG. 10D illustrates a fourth flow chart of the system for detecting collisions.

FIG. 10D illustrates a fourth flow chart of the system for detecting collisions. In some embodiments, the exemplary algorithm shown in FIG. 10D is anticipated to be performed by a municipal computer 12A having one or more cameras 493A/493B/493C directed toward a roadway. The algorithm starts by capturing a first image 420 from one of the cameras 493A/493B/493C (note the same or similar steps are performed for other cameras as well as inter-camera as vehicles will travel in and out of view of each of the cameras 493A/493B/493C. Next, a fixed time delay is performed 422, then a second image 424 is captured from one of the cameras 493A/493B/493C. Recognition algorithms are used to determine the first position 426 of each vehicle ($PV_n$) and then recognition algorithms are used to determine the second position 428 of each vehicle ($PV_n'$). Now a distance traveled ($DIST_n$) is calculated 430 as the difference between the positions of each vehicle before ($PV_n$) and after ($PV_n'$) the fixed delay. The velocity ($VEL_n$) of each vehicle is then calculated 431 (DISTn/fixed delay). The velocity of each vehicle ($VEL_n$) is saved 432 for subsequent loops. Having a previous velocity from the previous pass of the loop, an acceleration is calculated 433 ((prior loop $VEL_n$-current VEL$_n$/fixed time). Note the acceleration is anticipated to be either positive (acceleration) or negative (deceleration), or even sideways acceleration. Now a test 434 is performed to determine if the acceleration is greater than a predetermined acceleration threshold or the deceleration is less than a pre-determined deceleration threshold (e.g. an acceleration or deceleration greater than 1.1 gravitational forces or a deceleration less than −1.1 gravitational forces). Note that it is anticipated that there be different thresholds for each directional axis of the index vehicle 5. For example, one threshold for acceleration, one threshold for deceleration, and still another threshold for sideways acceleration in either direction. If the test 434 determines that the acceleration (or deceleration) is not greater than the predetermined threshold or less than the pre-determined deceleration threshold, the loop continues (C). If the test 434 determines that the acceleration (or deceleration) is greater than the predetermined threshold or less than the pre-determined deceleration threshold, a notification step is initiated. In the example shown, the software records the location of the vehicle from, for example, the specific camera 493A/493B/493C. Help is then summoned 438, providing the location and severity (e.g. >1.1 g, >5 g, >10 g) to an operator such as a 911 operator or another municipal employee. The person receiving the help request reviews the data (and optionally the cameras 493A/493B/493C) to determine what type of response needs to be made. For example, if the acceleration or deceleration is very high, an ambulance or life-flight is dispatched. If the acceleration or deceleration is low, an officer and maybe a tow truck is dispatched, etc. Note that similar functions are applied to other ways to obtain velocity data such as speed sensors 495A/495B/495C, radar 496 aimed at the roadway (e.g. radar 496 in speed warning signs), laser speed detectors 494, etc.

Figure 11:
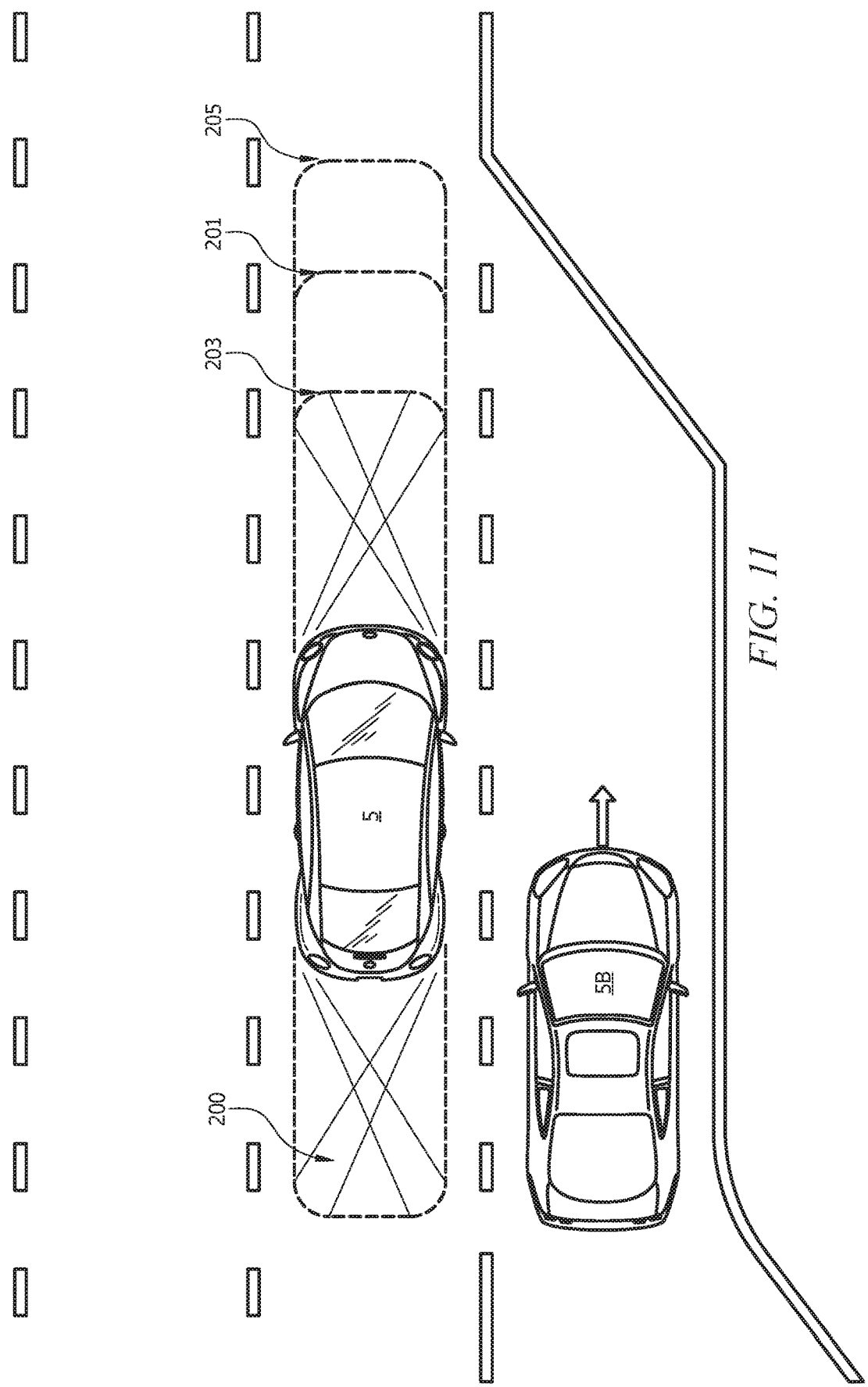
FIG. 11 illustrates a sixth schematic view of a vehicle with illumination zones of the system for avoiding accidents.

FIG. 11 illustrates a sixth schematic view of a vehicle with illumination zones of the system for avoiding accidents. In this example, the index vehicle 5 is traveling in the rightmost lane of a highway having an entrance ramp and another vehicle 5B is entering the highway on an entrance ramp. As many drivers know, it is always a complex decision process when a vehicle enters the roadway on an entrance ramp. Often, the other vehicle 5B that is entering the highway tries to speed up to the average speed of the highway (e.g. the speed at which the index vehicle 5 is traveling). Seeing the other vehicle 5B entering the highway, the driver of the index vehicle 5 often does one of three things: maintains speed, increases speed, or slows down. Not knowing what the driver of the index vehicle 5 will do, the other vehicle will do one of three things: speed up to try and enter in front of the index vehicle, slow down to try and enter behind the index vehicle 5, or maintain speed thinking the index vehicle 5 will yield or change lanes.

Having the ability to project an image, the index vehicle 5 projects an image of a safety zone 201/202/205 on the roadway in front of the index vehicle 5. This shows the other vehicle 5B two things: a location at which it is safe to enter the highway in front of the index vehicle, and whether the index vehicle is increasing or decreasing speed. For example, if the index vehicle 5 increases speed, the safety zone size increases from 201 to 205, indicating to the other vehicle 5b that the other vehicle 5b needs to slow down and enter behind the index vehicle 5. If the index vehicle 5 decreases speed, the safety zone size decreases from 201 to 203, indicating to the other vehicle 5b that the other vehicle 5b is able to enter in front of the index vehicle 5, preferably in front of the, now smaller, safety zone 203.

A similar rear safety zone 200 is projected behind the index vehicle 5 to show the other vehicle 5B where to enter the highway at a safe distance behind the index vehicle 5.

Figure 12:
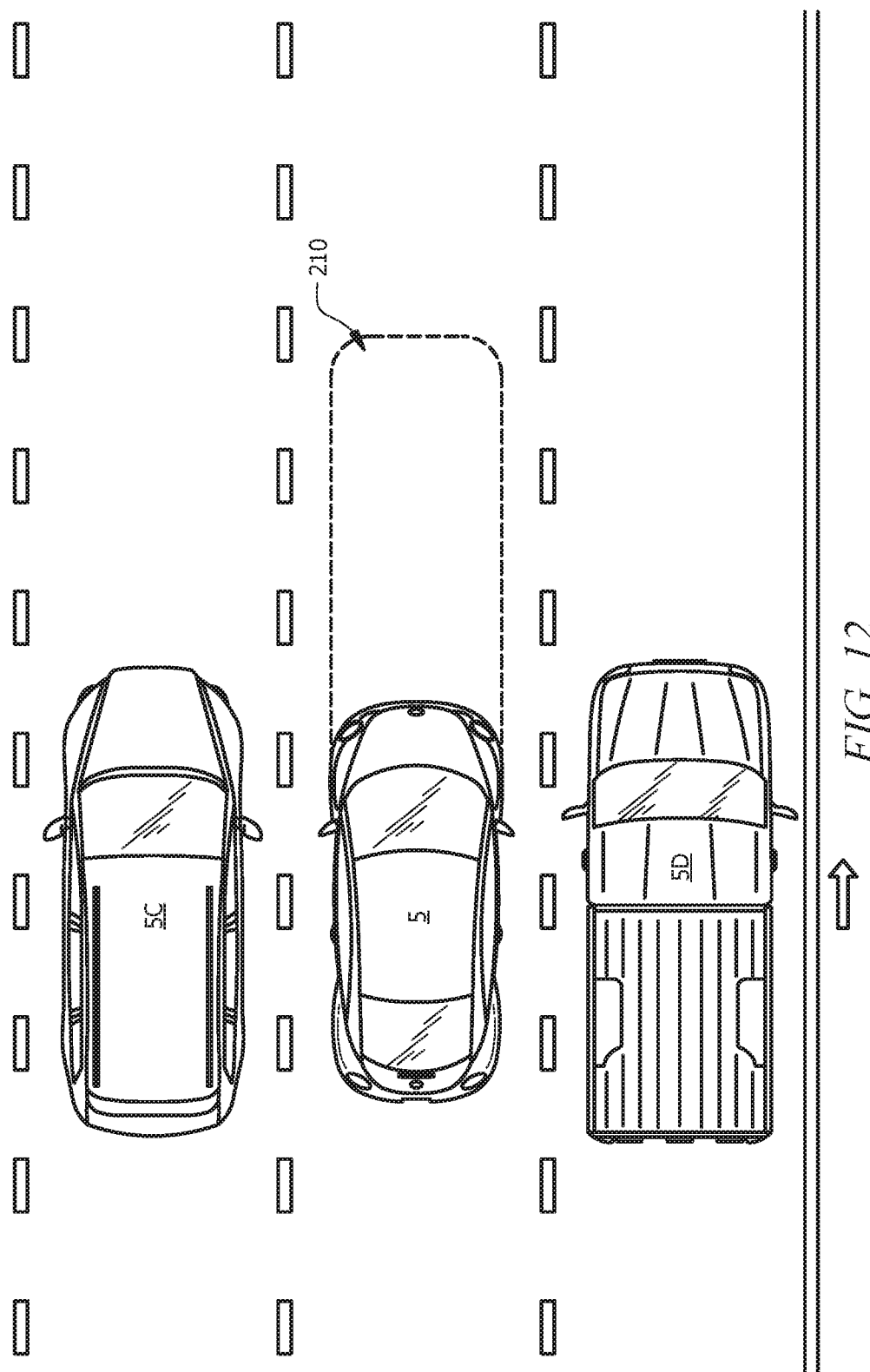
FIG. 12 illustrates a seventh schematic view of a vehicle with illumination zones of the system for avoiding accidents.

FIG. 12 illustrates a seventh schematic view of a vehicle with illumination safety zones 210 of the system for avoiding accidents. As vehicles 5/5C/5D travel on multi-lane roads, often other vehicles 5C/5D desire to change lanes in front of the index vehicle 5. In such, there is no leading/trailing vehicle relationship, but there are relative speeds of each other vehicle 5C/5D with respect to the index vehicle 5. In this, the forward safety zone 210 projects an area in front of the index vehicle 5 in which is it not safe to enter when changing lanes, based upon the speed of each vehicle 5/5C/5D. For example, if the other vehicle 5D is traveling much faster than the index vehicle 5, then the forward safety zone 210 is projected closer to the index vehicle (smaller forward safety zone 210) as it would be difficult for the index vehicle 5 to catch up to the speeding other vehicle 5D, but if the other vehicle 5D is only traveling slightly faster than the index vehicle, then a larger safety zone 210 is projected as the index vehicle 5 is in danger if the other vehicle 5D enters the same lane too close to the index vehicle 5.

Figure 13:
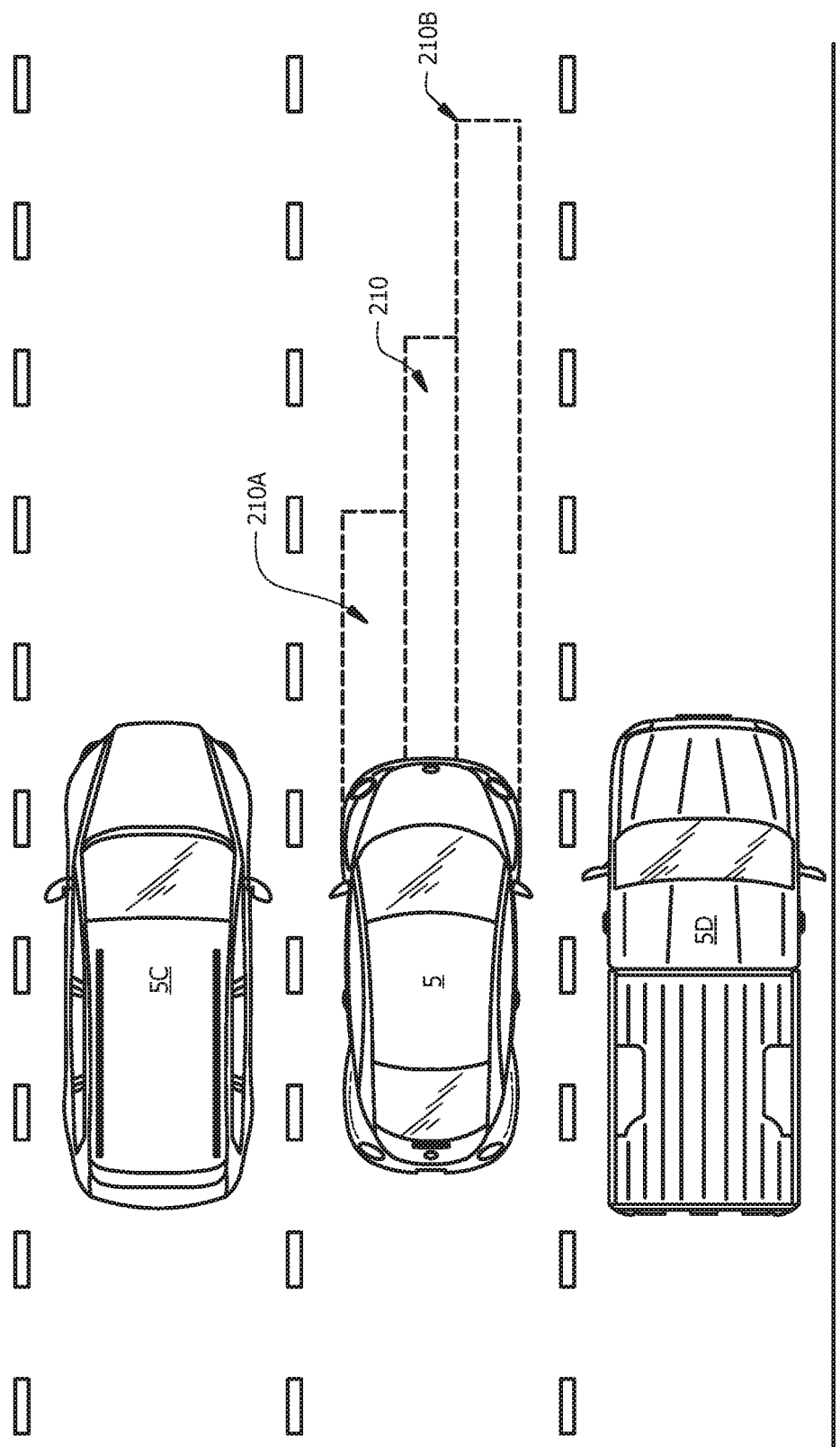
FIG. 13 illustrates an eighth schematic view of a vehicle with illumination zones of the system for avoiding accidents.

FIG. 13 illustrates an eighth schematic view of an index vehicle 5 with safety zones 201/201A/210B of the system for avoiding accidents. In this example, the safety zones 201/201A/210B is projected in three segments. A first safety zone segment 201A indicates to a driver of another vehicle 5C approaching on the left side of the index vehicle 5 where it would not be safe to enter into the lane of the index vehicle 5. A second safety zone segment 201C indicates to a driver of another vehicle 5D approaching on the right side of the index vehicle 5 where it would not be safe to enter into the lane of the index vehicle 5. Note that the safe entry point for each other vehicle 5C/5D depends upon the relative speed of the other vehicle 5C/5D compared with that of the index vehicle 5. For example, if the other vehicle 5C/5D is traveling much faster than the index vehicle 5, the safety zone on that side will be smaller and if the other vehicle 5C/5D is traveling slightly faster than the index vehicle 5, the safety zone on that side will be longer.

A third safety zone 210 indicates the general safety zone as per the prior examples.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A collision detection system comprising:
   one or more sensors, the sensors comprise at least one camera for determining an instantaneous velocity of a vehicle;
   a computer, the computer interfaced to the one or more sensors, the computer obtaining the instantaneous velocity of the vehicle from the one or more sensors;
   the computer operatively configured to execute software that operates the computer to iteratively calculate an acceleration of the vehicle as a rate of change of the instantaneous velocity over a period of time by recognizing the vehicle at a first location at a first time and at a second location at a second time as the instantaneous velocity is calculated by the software based upon the distance traveled between the first location and the second location divided by the time difference between the first time and the second time;

wherein the software declares a collision is detected when the acceleration is greater than a predetermined value or the acceleration is less than a predetermined negative value;

wherein, when the software declares the collision, the collision is classified with a severity of moderate, severe, or potentially lethal, depending on the magnitude of the determined value of the acceleration; and wherein, a notification including the determined value of acceleration is reported to dispatch help that corresponds to the severity of the collision.

2. The collision detection system of claim 1, wherein the predetermined value is 1.1 g and the predetermined negative value is −1.1 g.

3. The collision detection system of claim 1, wherein the sensors comprise roadway speed sensors.

4. The collision detection system of claim 1, wherein the sensors comprise radar speed sensors.

5. The collision detection system of claim 1, wherein the sensors comprise laser speed sensors.

6. The collision detection system of claim 1, wherein the sensors further comprise at least one speed sensor that uses a global positioning satellite receiver to measure the instantaneous velocity of the vehicle.

7. The collision detection system of claim 1, wherein the one or more cameras are aimed at a roadway from above.

8. The collision detection system of claim 7, wherein the one or more cameras are part of a hovering aircraft.

9. The collision detection system of claim 1, wherein the predetermined value and the predetermined negative value are adjusted based upon weather conditions selected from the group consisting of rain, ice, sleet, fog, and snow.

10. The collision detection system of claim 1, wherein the predetermined negative value is factory set based upon a deceleration value for the vehicle.

11. The collision detection system of claim 1, wherein the predetermined value is factory set based upon a maximum acceleration value for the vehicle.

12. The collision detection system of claim 1, wherein the software declares the collision is detected for the vehicle when a turning angle and/or a turning radii deviate from a predetermined factory set value for the vehicle.

13. A method of detecting a collision comprising:

measuring a first velocity of a vehicle at a first point in time using a global positioning satellite receiver speed sensor;

measuring a second velocity of the vehicle at a second point in time using the global positioning satellite receiver speed sensor;

calculating a velocity difference between the first velocity and the second velocity;

calculating an acceleration by dividing the velocity difference by a difference between the first point in time and the second point in time; and declaring the collision if the acceleration is greater than a predetermined value or the acceleration is less than a predetermined negative value;

wherein, the step of declaring the collision further includes classifying the collision with a severity of moderate, severe, or potentially lethal, depending on the magnitude of the acceleration; and initiating a notification to dispatch help that includes a value of the acceleration and the severity of the collision.

14. The method of detecting the collision of claim 13, wherein the predetermined value is 1.1 g and the predetermined negative value is −1.1 g.

15. The method of detecting the collision of claim 14, wherein the step of measuring the first velocity of the vehicle and measuring the second velocity of the vehicle includes reading a roadway speed sensor.

16. The method of detecting the collision of claim 14, wherein the step of measuring the first velocity of the vehicle and measuring the second velocity of the vehicle includes reading a radar speed sensor.

17. Program instructions tangibly embodied in a non-transitory storage medium for detecting a collision, wherein the at least one instruction comprises:

computer readable instructions iteratively read one or more sensors that provide an instantaneous velocity of a vehicle, the one or more sensors comprise laser speed sensors;

the computer readable instructions iteratively calculate an acceleration of the vehicle as a rate of change of the instantaneous velocity over a period of time; and the computer readable instructions declare the collision when the acceleration is greater than a predetermined value or the acceleration is less than a predetermined negative value;

wherein, after the computer readable instructions declare the collision, the computer readable instructions classify the collision with a severity of moderate, severe, or potentially lethal, depending on the magnitude of the acceleration; and the computer readable instructions initiate a notification to dispatch help that includes a value of the acceleration and the severity of the collision.

18. The program instructions tangibly embodied in the non-transitory storage medium for detecting the collision of claim 17, wherein the predetermined value is 1.1 g and the predetermined negative value is −1.1 g.

19. The program instructions tangibly embodied in the non-transitory storage medium for detecting the collision of claim 17, wherein the one or more sensors comprise roadway speed sensors.

20. The program instructions tangibly embodied in the non-transitory storage medium for detecting the collision of claim 17, wherein the one or more sensors comprise radar speed sensors.

21. The program instructions tangibly embodied in the non-transitory storage medium for detecting the collision of claim 17, wherein the one or more sensors further comprise a global positioning satellite receiver speed sensor.

22. The program instructions tangibly embodied in the non-transitory storage medium for detecting the collision of claim 17, wherein the one or more sensors comprise at least one camera and the computer readable instructions calculate the instantaneous velocity of the vehicle by recognizing the vehicle at a first location at a first time and at a second location at a second time as the velocity is calculated by the software based upon the distance traveled between the first location and the second location divided by the time difference between the first time and the second time.

* * * * *